United States Patent

Tatsuta

[11] Patent Number: 6,148,429
[45] Date of Patent: Nov. 14, 2000

[54] INFORMATION REPRODUCTION SYSTEM

[75] Inventor: Seiji Tatsuta, Hino, Japan

[73] Assignee: Olympus Optical Co., Ltd., Tokyo, Japan

[21] Appl. No.: 09/064,996

[22] Filed: Apr. 23, 1998

[30] Foreign Application Priority Data

May 1, 1997 [JP] Japan .................................. 9-113893

[51] Int. Cl.[7] .................................................. G11C 29/00
[52] U.S. Cl. ........................................................ 714/763
[58] Field of Search .................................. 714/763, 768, 714/769, 752; 369/47, 48, 275.3

[56] References Cited

U.S. PATENT DOCUMENTS

| | | | |
|---|---|---|---|
| 5,596,565 | 1/1997 | Yonemitsu et al. | 369/275.3 |
| 5,694,381 | 12/1997 | Sako | 369/58 |
| 5,701,160 | 12/1997 | Kimura et al. | 348/400 |
| 5,724,364 | 3/1998 | Mori et al. | 371/6 |
| 5,841,793 | 11/1998 | Fukuda | 371/37.01 |
| 5,866,895 | 2/1999 | Fukuda et al. | 235/494 |
| 5,872,864 | 2/1999 | Imade et al. | 382/176 |
| 5,896,403 | 4/1999 | Nagasaki et al. | 371/37.1 |
| 5,943,448 | 8/1999 | Tatsuta | 382/270 |

FOREIGN PATENT DOCUMENTS 0 670 555 A1  9/1995  European Pat. Off. .
0 717 398 A2  6/1996  European Pat. Off. .

Primary Examiner—Albert De Cady
Assistant Examiner—Samuel Lin
Attorney, Agent, or Firm—Frishauf, Holtz, Goodman, Langer & Chick, P.C.

[57] ABSTRACT

The address data acquiring section causes the format information storage section to store the format information concerning the allocation of addresses to the blocks of a code to be read out and the plural addresses provisionally determining section restores the address data from each of two or more than two blocks found in a picked up image and detected by the block detecting section. Then, it causes the address determining section to determine the correct address of each of the blocks according to the provisionally determined address data for the two or more than two blocks and the format information stored in the format information storage section. The information data reproducing section rearranges and reproduces the block data restored from the blocks detected by the block detecting section and restored by the block data restoring section according to the address information determined by the address determining section.

10 Claims, 15 Drawing Sheets

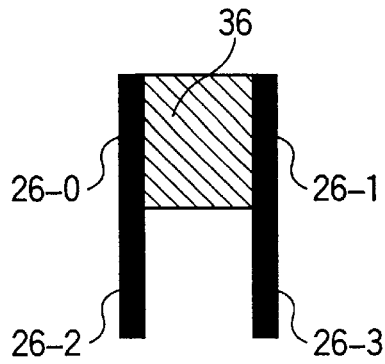

FIG. 5

| LOCATIONS RELATIONSHIP OF BLOCKS | CORRESPONDING RELATIONSHIP OF ADDRESSES |
|---|---|
| ATTENTIONAL BLOCK | i |
| FIRST BLOCK | i+1 |
| SECOND BLOCK | i+n |
| THIRD BLOCK | i+n+1 |

FIG. 6

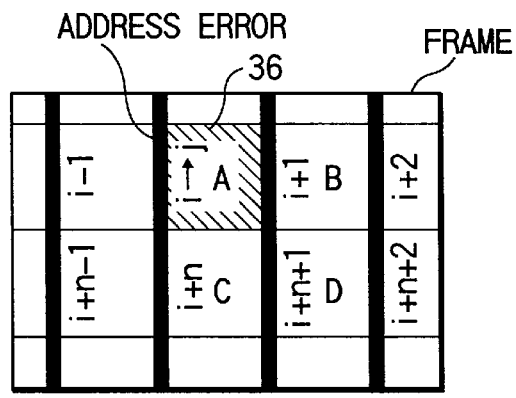

FIG. 7

| LOCATIONS RELATIONSHIP OF BLOCKS | CORRESPONDING RELATIONSHIP OF ADDRESSES | COUNTED BACK ADDRESS OF ATTENTIONAL BLOCK |
|---|---|---|
| ATTENTIONAL BLOCK | j | j |
| FIRST BLOCK | i+1 | i |
| SECOND BLOCK | i+n | i |
| THIRD BLOCK | i+n+1 | i |

$\text{det\_add}(A) = \text{maj}\{\text{add}(A), \text{add}(B)-1, \text{add}(C)-n, \text{add}(D)-n-1\}$ $\text{det\_add}(A) = \text{maj}(j, i, i, i) = i$

FIG. 8

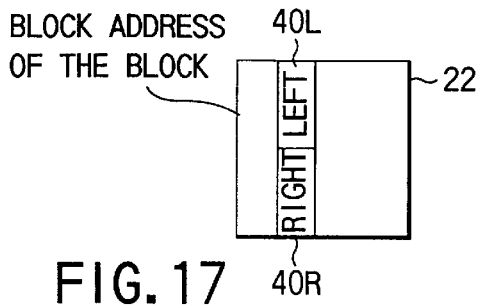
FIG. 17
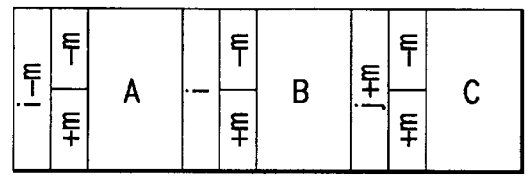
FIG. 18
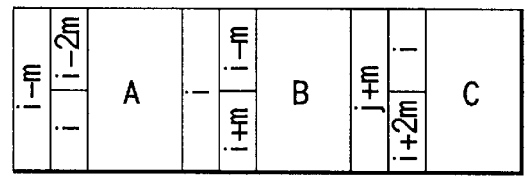
FIG. 20
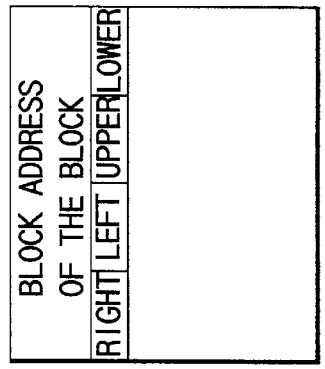
FIG. 22
FIG. 19
|  | | ADDRESS | | | RELATIVE ADDRESS | |
|---|---|---|---|---|---|---|
|  | | A | B | C | LEFT | RIGHT |
| BLOCK | A | i−m | i | − | −m | +m |
|  | B | i−m | i | i+m | −m | +m |
|  | C | − | j | j+m | −m | +m |
| ESTIMATED ADDRESS | | i−m | i | i+m | −m | +m |
FIG. 21
|  | | ADDRESS | | |
|---|---|---|---|---|
|  | | A | B | C |
| BLOCK | A | i−m | i | − |
|  | B | i−m | i | i+m |
|  | C | − | i | j+m |
| ESTIMATED ADDRESS | | i−m | i | i+m |
FIG. 23
| 14 | 8 | 21 | 25 |
| 24 | 16 | 18 | 13 |
| 15 | 20 | 29 | 7 |
| 5 | 12 | 2 | 23 |
| 31 | 17 | 26 | 4 |
| 3 | 27 | 9 | 19 |
| 22 | 6 | 32 | 10 |
| 1 | 11 | 30 | 28 |
FIG. 24

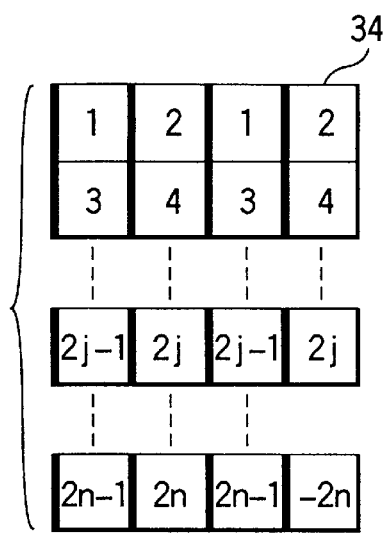
FIG. 25
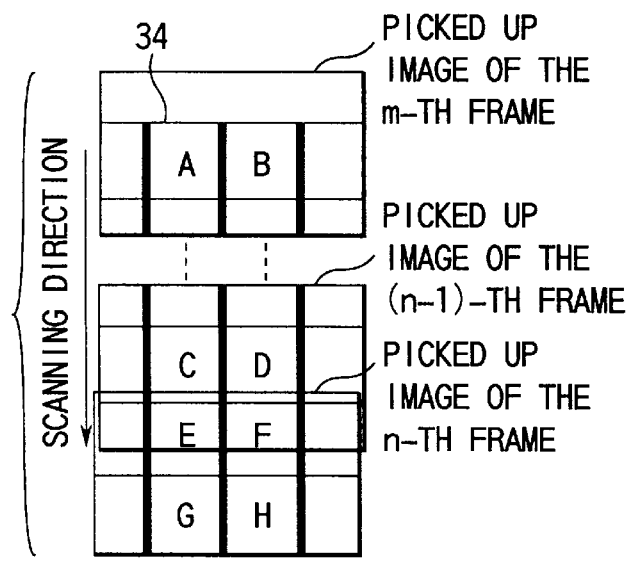
FIG. 26
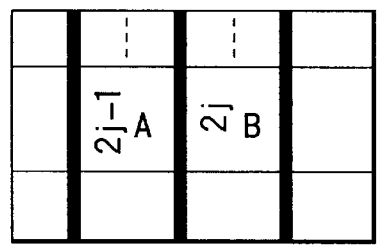
PICKED UP IMAGE OF THE m-TH FRAME
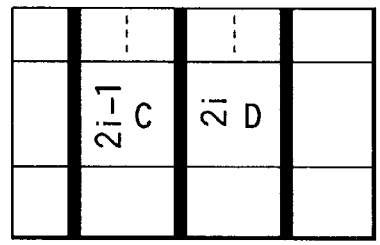
PICKED UP IMAGE OF THE (n-1)-TH FRAME
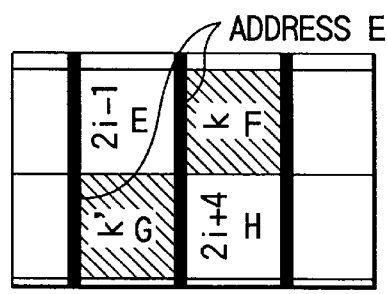
PICKED UP IMAGE OF THE n-TH FRAME
FIG. 27

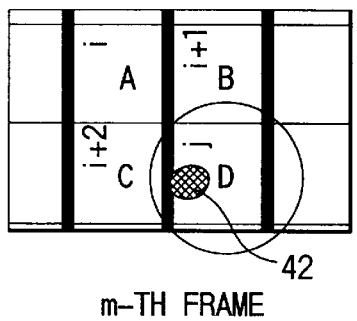
FIG. 30A  m-TH FRAME
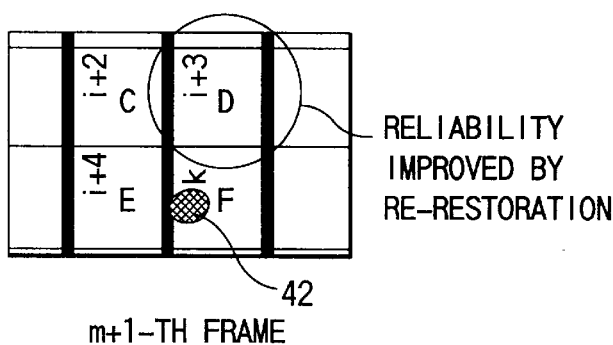
FIG. 30B  m+1-TH FRAME
RELIABILITY IMPROVED BY RE-RESTORATION
| FRAME | BLOCK | OUTPUT OF PROVISIONAL ADDRESS DETERMINING SECTION | OUTPUT OF ADDRESS DETERMINING SECTION | CONVINCEDNESS RATING | RE-RESTORATION PROHIBITION FLAG |
|---|---|---|---|---|---|
| m | A | i | i | 1 | 0→1 |
|   | B | i+1 | i+1 | 1 | 0→1 |
|   | C | i+2 | i+2 | 1 | 0→1 |
|   | D | j | i+3 | 0 | 0→0 |
| m+1 | C | i+2 | i+2 | 1 | 1 × |
|   | D | i+3 | i+3 | 1 | 0→1 |
|   | E | i+4 | i+4 | 1 | 0→1 |
|   | F | k | i+5 | 0 | 0→0 |
FIG. 31

| FRAME | BLOCK | STORAGE ADDRESS | OUTPUT OF PROVISIONAL ADDRESS DETERMINING SECTION | OUTPUT OF ADDRESS DETERMINING SECTION | CON-VINCEDNESS RATING | RE-RESTORATION PROHIBITION FLAG |
|---|---|---|---|---|---|---|
| m | A | i+1 | i | i | 1 | 0→1 |
| | B | | i+1 | i+1 | 1 | 0→1 |
| | C | i+3 | i+2 | i+2 | 1 | 0→1 |
| | D | | j | i+3 | 0 | 0→0 |
| m+1 | C | i+3 | i+2 | i+2 | 1 | 1 × |
| | D | | i+3 | i+3 | 1 | 0→1 |
| | E | i+5 | i+4 | i+4 | 1 | 0→1 |
| | F | | k | i+5 | 0 | 0→0 |

FIG. 32

| FRAME | BLOCK | OUTPUT OF PLURAL ADDRESSES PROVISIONALLY DETERMINING SECTION | NUMBER OF ERROR CORRECTION BITS | CONVINCEDNESS RATING | TRANSITION OF STORED CONVINCEDNESS |
|---|---|---|---|---|---|
| m | A | i | 1 | 7 | 0→7 |
| | B | i+1 | 5 | 3 | 0→3 |
| | C | i+2 | 2 | 6 | 0→6 |
| | D | j | 4 | 4 | 0→4 |
| m+1 | C | i+2 | 4 | 4 | 6 × |
| | D | i+3 | 2 | 6 | 4→6 |
| | E | i+4 | 8 | 0 | 0→0 |
| | F | k | 3 | 5 | 0→5 |

6 > 4 NO RE-RESTORATION
4 < 6 RE-RESTORATION

FIG. 34

INFORMATION REPRODUCTION SYSTEM

BACKGROUND OF THE INVENTION

This invention relates to an information reproduction system adapted to reduce the rate of faulty code reproduction due to address errors in reproducing codes that are optically readably recorded according to a predetermined block arrangement format for information data that comprise block data obtained by dividing the information data by a given data volume and block headers allocated to the respective blocks to show their addresses.

The assignee of the present invention proposed an information recording/reproduction system for recording digital data on a recording medium and reproducing the recorded data as described in Patent Publication EP 0,670,555 A1 (which corresponds to U.S. Ser. No. 80/407,018).

With a system as proposed in the above patent document, data are divided into blocks, each having a predetermined data volume, and an address data is affixed to each of the blocks. For reproducing the data, the block data of each of the blocks are read out with the address affixed thereto and all the read out block data are combined according to the addresses to reproduce the original data. Thus, with the characteristic feature of dividing data into blocks and affixing an address to each of the blocks, the system is highly adapted to data expansion and shows an enhanced level of flexibility for reading data. For example, the data picked up by the system as an image can be read by scanning the codes in the image no matter how densely the data are arranged in the image and even if the blocks are arranged at random and the image is scanned manually at a varying scanning speed to give rise to a blurred effect.

While the use of block addresses is highly effective, sufficient care and measures should be taken not to miss any of them.

As a countermeasure for missing block addresses, EP 0,670,555 A1 proposes the use of interpolation. Thus, if a block address fails to be detected, it is estimated by interpolation from neighboring block addresses. Meanwhile, EP 0,717,398 A2 (which corresponds to U.S. Ser. No. 08/571,776) proposes a system of affixing an error correction code to each address and, when error correction is not possible for a read out address data, estimating the address from neighboring addresses. With such a system, the rate of faulty code reproduction due to missing block data can be reduced if the address of an attentional block cannot be read out.

However, neither EP 0,670,555 A1 nor EP 0,717,398 A2 is satisfactory for instances where addresses are read out (and/or corrected) wrongly. If an address error occurs, the block data of that address can be read out as the data of some other address to make the code reproducing operation faulty.

In other words, there is a problem that the reliability or validity of the read out block addresses is not checked by a system according to either of the above patent documents.

BRIEF SUMMARY OF THE INVENTION

In view of the above identified problem, it is therefore the object of the present invention to provide an information reproduction system that can reduce faulty code reproductions due to address errors.

According to an aspect of the invention, there is provided an information reproduction system comprising:

image reading means for picking up and optically reading a code having a plurality of blocks arranged according to a predetermined block arrangement format, each of the blocks having at least a data pattern image corresponding to the contents of a block data formed by dividing the information data of the code by a given data volume and a header pattern image formed according to a block header indicating an address allocated to the block, so as to make each picked up image contain more than one blocks;

block detection means for detecting each block from each code image picked up by the image reading means;

address data acquisition means for acquiring the address data of each block detected by the block detection means;

block data restoration means for restoring the block data of each block detected by the block detection means from the data pattern of the block; and information data reproduction means for combining the block data of the blocks of the codes restored by the block data restoration means according to the address data acquired by the address data acquisition means, wherein the address data acquisition means includes:

plural address provisionally determining means for restoring and provisionally determining the address data of each of two or more than two blocks detected out of a picked up image by the block detection means;

format information storage means for storing the format information relating to the address allocation for each of the blocks of the code to be read; and address determining means for determining the address of each of the blocks according to the address data of the two or more than two blocks provisionally determined by the plural address provisionally determining means and the format information stored in the format information storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a schematic illustration of the locational relationship of blocks and their addresses.

FIG. 6 is a table showing the correspondence of the locational relationships of blocks and the corresponding relationships of their addresses.

FIG. 7 is a schematic illustration of the blocks and their addresses in a picked up image.

FIG. 8 is a table showing the correspondence of the locational relationships of blocks, the corresponding relationships of their addresses and the corresponding relationships of attentional blocks to be calculated backwardly.

FIG. 17 is a schematic illustration of an alternative block arrangement that can be used for the fourth embodiment.

FIG. 18 is a schematic illustration of the blocks and their addresses in a picked up image.

FIG. 19 is a schematic illustration of the addresses of the blocks that can be obtained from the picked up image of FIG. 18.

FIG. 20 is a schematic illustration of the blocks and their addresses with a still another alternative block arrangement that can be used for the fourth embodiment.

FIG. 21 is a schematic illustration of the addresses of the blocks that can be obtained from the picked up image of FIG. 20.

FIG. 22 is a schematic illustration of another alternative block arrangement that can be used for the fourth embodiment.

FIG. 23 is a schematic illustration of a block arrangement format that can be use for the arrangement of FIG. 22.

FIG. 24 is a schematic illustration of the blocks and their addresses in a picked up image.

FIG. 25 is a schematic illustration of a block arrangement format that can be use for a fifth embodiment of information reproduction system according to the invention.

FIG. 26 is a schematic illustration of codes and image pick-up zones that can be used for the fifth embodiment.

FIG. 27 is a schematic illustration of frames and picked up blocks.

FIGS. 30A and 30B are illustrations showing how reliability is improved by re-restoration for the purpose of the invention.

FIG. 31 is a schematic illustration of convincedness and re-restoration control that can be used for the purpose of the invention.

FIG. 32 is a schematic illustration of convincedness and re-restoration control that can be used for a seventh embodiment of information reproduction system according to the invention.

FIG. 34 is a schematic illustration of convincedness and re-restoration control that can be used for the eight embodiment.

DETAILED DESCRIPTION OF THE INVENTION

Now, the present invention will be described by referring to the accompanying drawing that illustrates preferred embodiments of the invention.

1st Embodiment

Figure 1:
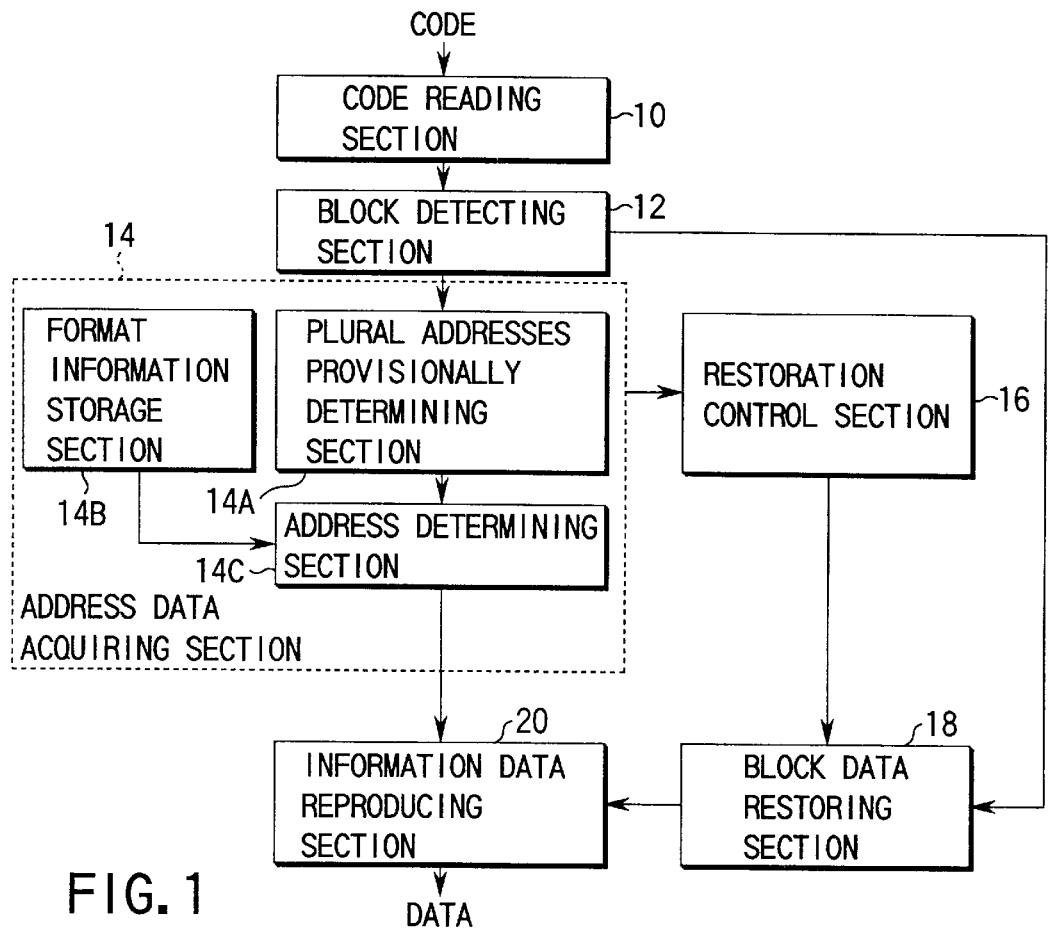
FIG. 1 is a schematic block diagram of a first embodiment of information reproduction system according to the invention.

FIG. 1 is a schematic block diagram of a first embodiment of information reproduction system according to the invention.

Referring to FIG. 1, the embodiment of information reproduction system comprises a code reading section 10, a block detecting section 12, an address data acquiring section 14, a restoration control section 16, a block data restoring section 18 and an information data reproducing section 20. The address data acquiring section 14 has a plural addresses provisionally determining section 14A, a format information storage section 14B and an address determining section 14C.

Figures 2, 3:
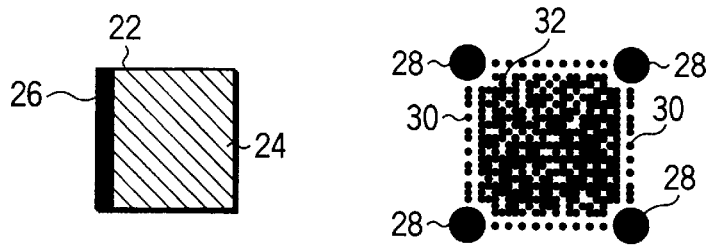
FIGS. 2 and 3 schematically show the structures of tow different blocks that can be used for the first embodiment.

The term "code" as used herein refers to a plurality of blocks of data that are arranged according to a predetermined block arrangement format and optically readably recorded. Referring to FIG. 2, each block 22 contains block data 24 obtained by dividing information data in question by a given data volume and a block header 26 allocated to the block to show address information. Referring to FIG. 3, data are recorded in the form of dots on a block 22. More specifically, markers 28 are arranged respectively at the four corners of the block and a header pattern 30 is recorded between any adjacent markers to show the address information that corresponds to the address header 26, while a data pattern 32 is recorded within the area surrounded by the markers to show the information data that corresponds to the block data 24. In FIG. 3, the left header pattern 30 shows the address information of the block and the right header pattern 30 shows the address information of the right neighboring block (not shown).

The code reading section 10 picks up the code comprising blocks that are arranged according to a predetermined block arrangement format and optically readably recorded and transforms it into an electric signal. The block detecting section 12 detects the blocks of the optically picked up code.

For example, if the block 22 has a structure as shown in FIG. 3, it can be detected by a known method as described in EP 0,717,398 A2 that firstly detects the markers at the four corners.

The address data acquiring section 14 detects the address information from the block detected by the block detecting section 12 on the basis of the block structure. The block data restoring section 18 restores the block data from the block detected by the block detecting section 12. The information data reproducing section 20 rearranges the block data restored by the block data restoring section 18 according to the address information detected by the address data acquiring section 14 in order to reproduce the recorded data.

The restoration control section 16 controls the operation of restoring the block data according to the address detected and read out by the address data acquiring section 14. For example, it may store the addresses it has read and so controls the block data restoring section 18 as to cause it not to restore the data of the block for which the address of some other block that has been restored by the block data restoring section 18 is entered by the address data acquiring section 14.

Figure 4:
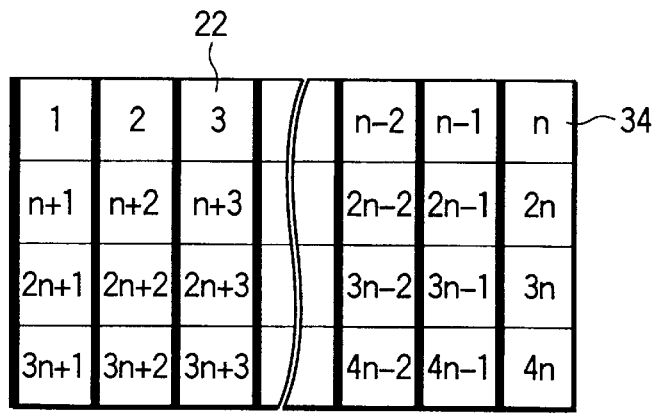
FIG. 4 is a schematic illustration of a format for arranging blocks for the first embodiment.

Now, the operation of the address data acquiring section 14 for reading a code 34 having a block arrangement format of FIG. 4 will be described. Not that each of the numerical figures in FIG. 4, denoted the address of the block where it is located.

Referring to FIG. 5, the plural addresses provisionally determining section 14A firstly reads out block header 26-0 containing the address information of attentional block 36 and the addresses 26-1, 26-2 and 26-3 of the first, second and third blocks having a predetermined locational relationship with the attentional block 36. Meanwhile, assuming that the address of the attentional block is "i", the format information storage section 14B stores a table of corresponding relationships as shown in FIG. 6, where the first, second and third blocks respectively have addresses of "i+1", "i+n" and "i+n+1". The address determining section 14C calculates the address of the attentional block 36 backwardly from the corresponding relationships of the addresses read out by the plural addresses provisionally determining section 14A and the attentional block 36 on a "decision by majority" basis.

This operation will be described in greater detail by referring to FIG. 7, where the attentional block 36 is block A and the address of the block A, or "i", is mistakenly read out to be as "j".

Then, the plural addresses provisionally determining section 14A restores and provisionally determines the addresses of the blocks A, B, C and D to be as "j", "i+1", "i+n" and "i+n+1". The address determining section 14C calculates the address of the attentional block 36 backwardly from the provisionally determined address and the table of corresponding relationships of FIG. 6 to obtain the result of FIG. 8 and determine that the address of the attentional block 36 to be "i".

Referring to FIG. 8, det_add(A) denotes the address of block A determined by the address determining section 14C and add(A) denotes the address of the block A restored by the plural addresses provisionally determining section 14A. Note that maj(a,b,c,d) in FIG. 8 denotes the result of the "decision by majority" operation when the address of the attentional block 36 obtained by calculating it backwardly from the addresses of the blocks A, B, C, D restored by the plural addresses provisionally determining section 14A is "a", "b", "c", "d".

Thus, with the first embodiment, address errors can be prevented and faulty code reproductions can be reduced by determining the address of an attentional block 36 on the basis of the addresses of at least two or more than two blocks and their corresponding relationships with the address of the attentional block.

2nd Embodiment

Now, a second embodiment of the invention will be described by referring to FIG. 9.

In this embodiment, the plural addresses provisionally determining section 14A comprises an address restoring section 14A1, an address properness judging section 14A2 and an address output control section 14A3.

Firstly, the address restoring section 14A1 restores an address from the block detected by the block detecting section 12. Then, the address properness judging section 14A2 judges if the address restored by the address restoring section 14A1 is a proper one for the information reproduction system. If the address is judged to be improper, the address output control section 14A3 prohibits the address from being output to the address determining section 14C.

For example, the address properness judging section 14A2 judges an address to be improper for the information reproduction system when the restored address is found to be out of a range defined for the information reproduction system or an address error is found to be out of a correctable range.

Thus, improper addresses are prevented from being used for determining an address to improve the efficiency of the address determining operation and the reliability of the determined address so that the effect of the first embodiment will be further improved in this embodiment.

3rd Embodiment

Now, a third embodiment of the invention will be described by referring to FIGS. 10 through 14.

Figure 10:
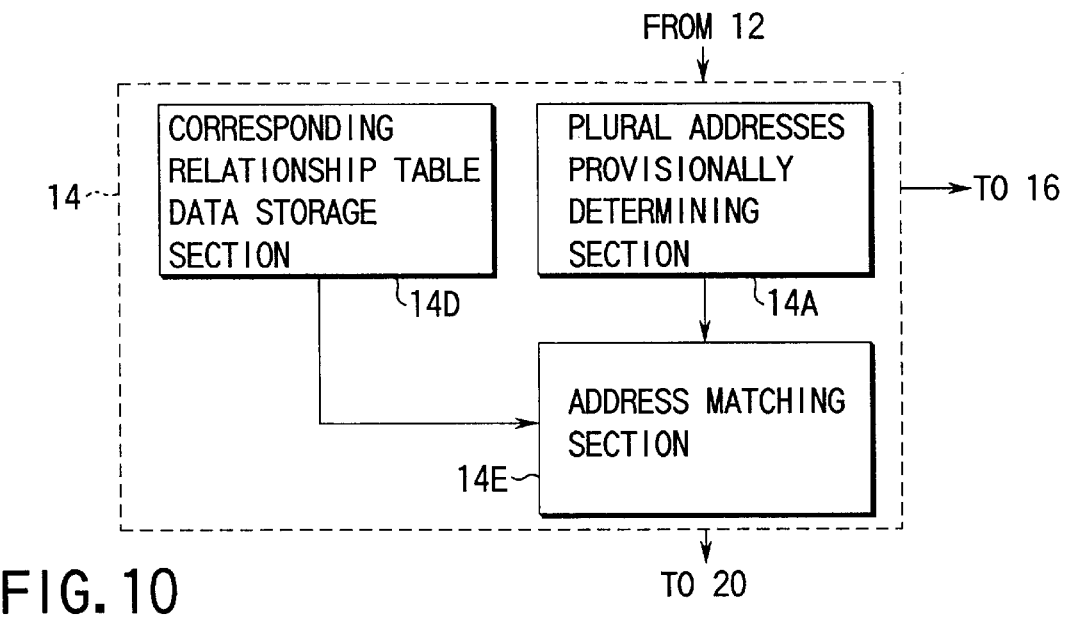
FIG. 10 is a schematic illustration of the address data acquiring section of a third embodiment of information reproduction system according to the invention.

In this embodiment, the address data acquiring section 14 comprises a corresponding relationship table data storage section 14D and an address matching section 14E as shown in FIG. 10 in place of the format information storage section 14B and the address determining section 14C of the first embodiment respectively.

Figures 11, 12, 13:
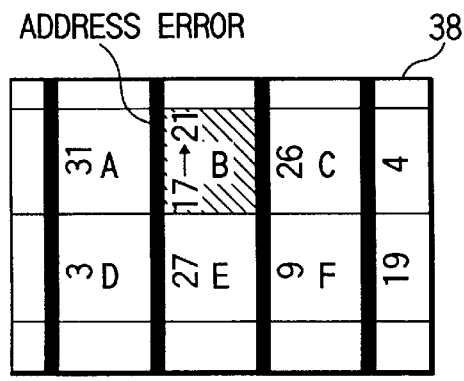
FIG. 11 is a schematic illustration of a block arrangement format that can be use for the third embodiment.
FIG. 12 is a table of a corresponding relationship.
FIG. 13 is a schematic illustration of the blocks and their addresses in a picked up image.

The corresponding relationship table data storage section 14D stores in advance a corresponding relationship table 14D' as shown in FIG. 12 for the block arrangement of a code 34 as shown in FIG. 11. The address matching section 14E selects a block zone showing a locational relationship closest to the block zone having the addresses provisionally determined by the plural addresses provisionally determining section 14A from the corresponding relationship table 14D' stored in the corresponding relationship table data storage section 14D. With this arrangement, address errors can be eliminated to restore correct addresses.

The address restoring operation of this embodiment will be described by referring to FIG. 13, where the address of block B is mistakenly indicated as "21" while its correct address is "17".

Figure 14:
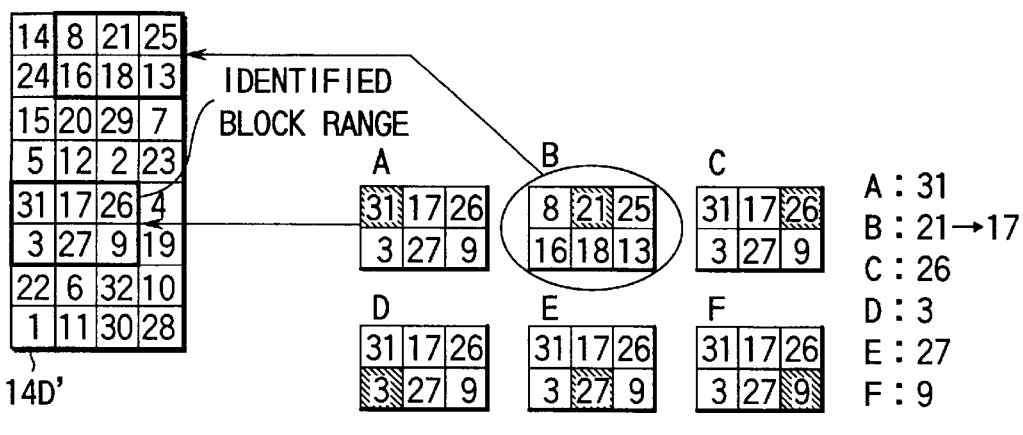
FIG. 14 is a schematic illustration of matchings that can be used for the purpose of the invention.

The address matching section 14E examines the matching between the addresses of the blocks A through F detected within a same frame 38 and the corresponding relationship table 14D' stored in the corresponding relationship table data storage section 14D as shown in FIG. 14 and, since the blocks A, C, D, E and F have a matching block zone in the table, specifies the block zone surrounded by emphatic solid lines in the table 14D' also for the block B. Thus, the address "21" in the block B is corrected to be as "17" so that now the block data can be restored.

Note that the address matching section 14E may alternatively utilize any other known matching means.

Thus, this embodiment can deal with a code having blocks that are not aligned in accordance with the order of the addresses.

Additionally, unlike the first and second embodiments where the address determining section 14C determines addresses on a one by one basis, the address matching section 14E can determine the addresses of a plurality of blocks detected within a same frame at a same time to further improve the efficiency of the address determining operation.

4th Embodiment

Now, a fourth embodiment of the invention will be described by referring to FIGS. 15 and 16.

Figure 15:
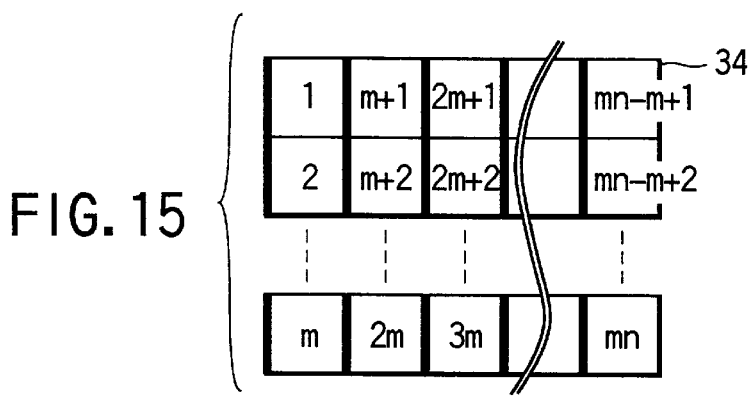
FIG. 15 is a schematic illustration of an aligned arrangement of blocks in a fourth embodiment of information reproduction system according to the invention.

In this embodiment, a code 34 is arranged with a format as shown FIG. 15 (note that m and n represent arbitrarily selectable numbers according to the code). Note that plural addresses provisionally determining section 14E of this embodiment reads the attentional block 36 and the blocks located at the lateral sides of the block 36.

In this embodiment, if there is no address error as shown in the upper block zone, the addresses of the blocks A, B and C will be restored to be as "j−m", "j" and "j+m" respectively so that the relationship between the blocks A and B will be identical with the relationship between the blocks B and C that are differentiated by m. Thus, the read out code will be identified by the block arrangement format with which the addresses of any adjacent block are differentiated by m. Then, the format information storage section 14B detects the difference of the addresses of adjacently located blocks on a block by block basis without identifying the format until the difference is found to be identical for all the addresses of adjacently located blocks. Once the difference is found to be identical, the format information storage section 14B determines the format by means of the difference, stores it and stops the operation to lock the format information.

Figure 16:
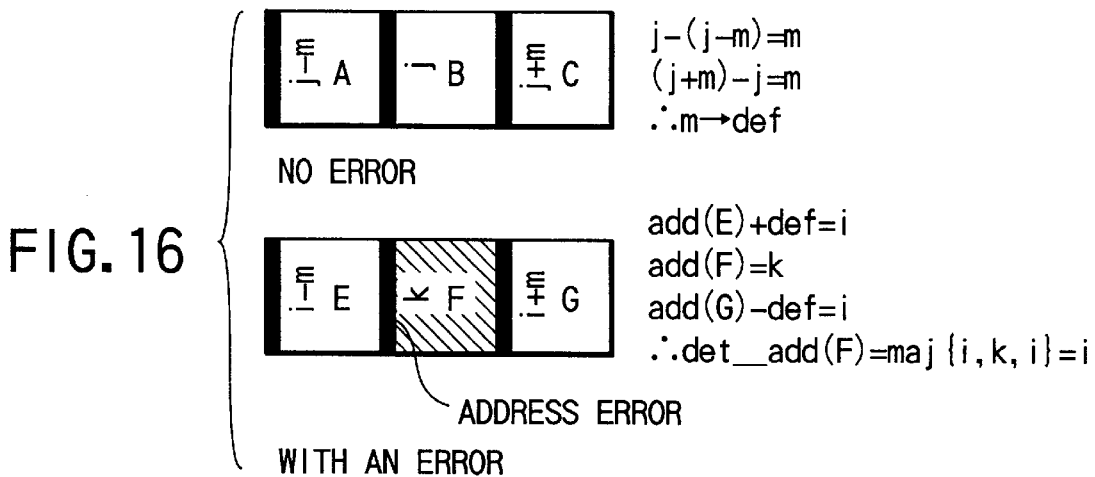
FIG. 16 is a schematic illustration of how addresses are determined for the fourth embodiment.

If, on the other hand, there is an address error as shown in the block F of the lower block zone of FIG. 16, the addresses of the blocks E, F and G are read out to be as "i−m", "k" and "i+m" respectively so that the address of the attentional block F will be determined to be as "i" on a decision by majority basis as it is calculated backwardly to obtain "i", "k" and "i". When the addresses of the blocks E, F and G are determined simultaneously, they will be "i−m", "i" and "i+m" respectively.

Thus, in addition to the effect of the first embodiment, this embodiment provides an additional effect of identifying the block arrangement format from the read out code so that the number of blocks in vertical and/or horizontal direction can be selected without restrictions if the blocks are arranged in the ascending or descending order of the addresses.

As described above, the format information storage section 14B stores the difference between the addresses of two adjacently located blocks that is identical for an attentional block and one of the laterally located adjacent blocks and for the attentional block and the other laterally located adjacent block. Therefore, if there occurs an error that makes the difference also identical for an attentional block and one of the laterally located adjacent blocks and for the attentional block and the other laterally located adjacent block, the format information storage section 14B stores the wrong difference. However, such an error will be neglected by this embodiment because the probability of occurrence of such an error is very low.

This embodiment may be so modified as to obtain format information from a code as will be described below.

With the modified embodiment, the relative addresses 40L and 40R of the laterally located adjacent blocks relative to an attentional block 22 are stored in the block 22 as shown in FIG. 17. Assuming now that the blocks A, B and C are picked up as shown in FIG. 18, the address of the block A will be "i−m" and that of the block B located to the right of the block A will be "i−m+m"="i" from the block A. Similarly, the address of the block B will "i", that of the block A located to the left of the block B will be "i−m" and that of the block C located to the right of the block B will be "i+m" from the block B. Finally, (also assuming that "i+m" is wrongly read out as "j+m") the address of the block C will be "j+m" and that of the block B located to the left of the block C will be "j+m−m"="j" as shown in FIG. 19. Thus, the format information storage section 14B stores an relative address "m" relative to the laterally located adjacent blocks so that the addresses of the blocks A, B and C will be determined to be "i−m", "i" and "i+m" respectively on the basis of decision by majority.

It will be appreciated that the use of relative addresses can be replaced by that of absolute addresses as shown in FIG. 20. Then, the addresses will be determined in a manner as illustrated in FIG. 21.

Alternatively, the addresses of the four adjacently located blocks may be used as shown in FIG. 22. Assume here that blocks are arranged randomly as shown in FIG. 23 and some of them are picked up for code 34 as shown in FIG. 24, where the address of block B is wrongly read out as "21" although the right address is "17". Then, the address of the block B will be determined in the following manner.

Since the addresses of the four adjacently located blocks are recorded in each block, the address of the block B will be recorded in blocks A, C and E. Thus, the address of the block B will be determined on the basis of decision by majority. Since all the addresses of the block B stored in the blocks A, C and E are equal to "17", the address of the block B will be determined to be "17". The address of each of the remaining blocks will be determined in a similar manner. Note, however, if a block does not have any adjacent block on a side, an address of "0" will be recorded.

As described above, format information can be obtained from a code 34 with the fourth embodiment so that address errors can be eliminated to restore correct addresses without storing a corresponding relationship table if blocks are arranged at random.

5th Embodiment

Now, a fifth embodiment of the invention will be described by referring to FIGS. 25 through 28.

In this embodiment, blocks are arranged for code 34 in a format where they have consecutive addresses in the scanning direction as shown in FIG. 25. Note that n can take any appropriate number for the code. The plural addresses provisionally determining section 14A is so adapted as to read out at least the addresses of at least two blocks rectangularly located relative to an attentional block. Assume that the blocks shown in FIG. 26 are picked up for the code 34 as they are scanned manually by an image pick-up means.

If there is no address error as shown in the top block zone, the addresses of the detected blocks A and B will be restored to be as "2j−1" and "2j" or "2j" and "2j−1" respectively so that the difference between the addresses of the blocks A and B is equal to "1" and the address of the block located adjacent to a block having an even number address will always be "1"less than the latter. The format information storage section 14B stores this relationship in advance.

This relationship holds true so long as there is no address error as seen from the middle block zone in FIG. 27.

Figures 28, 29:
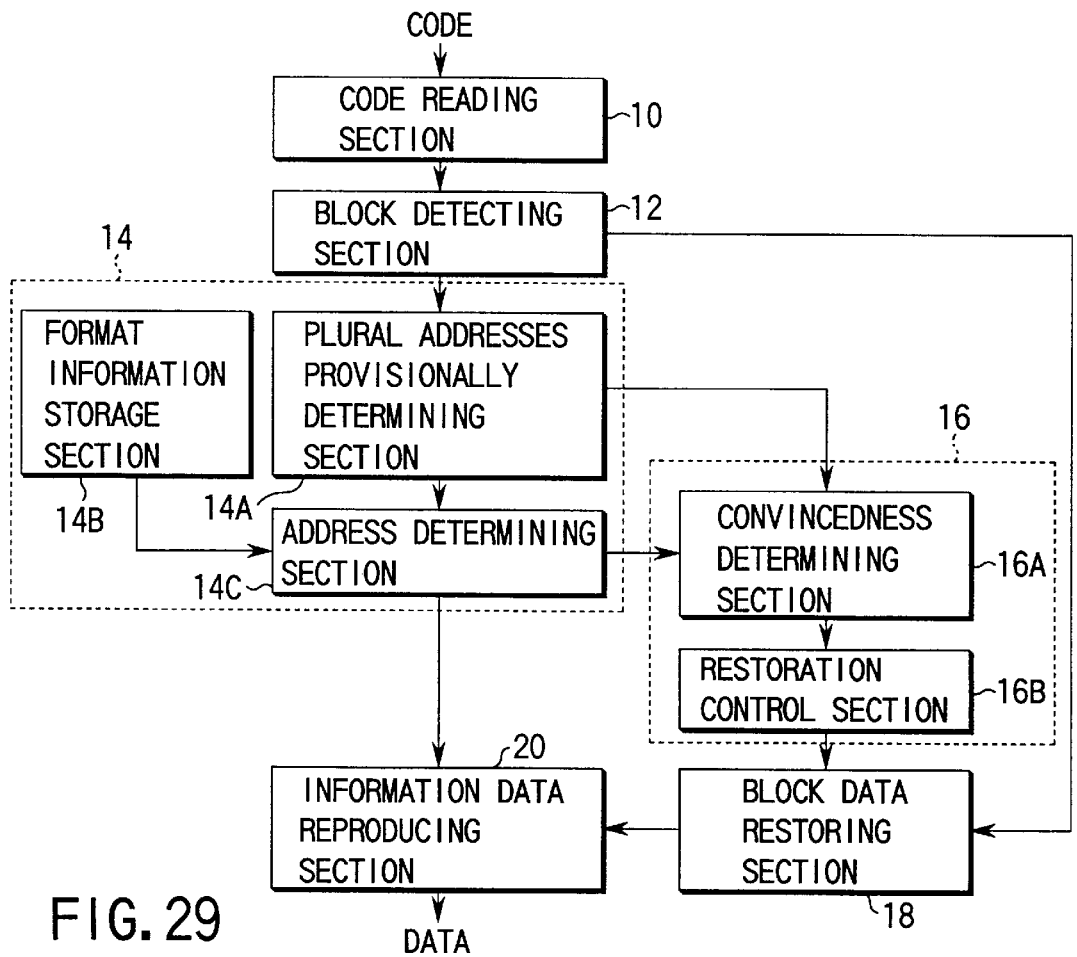
FIG. 28 is a schematic illustration showing how addresses are determined for read blocks.
FIG. 29 is a schematic block diagram of a sixth embodiment of information reproduction system according to the invention.

However, if an address error occurs as shown in the bottom block zone of FIG. 27 and the addresses of the blocks E and F are wrongly read out to be equal to "2i+1" and "k" respectively so that the stored corresponding relationship for addresses is found to be not holding true for these addresses. Then, the addresses of the blocks E and F are compared with the address "2i" of the block D determined immediately before and a relationship of $$|2i+1-2i|<|k-2i|$$

is found so that consequently address "2i+1" that is closer to the immediately preceding address than the other is selected for the block E. Thus, the addresses of the blocks E and F will be determined to be equal to "2i+1" and "2i+2" respectively. FIG. 28 shows the processing operation for determining the correct addresses.

Similarly, the addresses of the blocks G and H are wrongly read out to be equal to "k'" and "2i+4" respectively so that the stored corresponding relationship for addresses is once again found to be not holding true for these addresses. Then, likewise, the addresses of the blocks G and H are compared with the address "2i+2" of the block F determined immediately before and a relationship of $$|k'-(2i+2)|>|(2i+4)-(2i+2)|$$

is found so that consequently address "2i+4" that is closer to the immediately preceding address than the other is selected for the block H. Therefore, the addresses of the blocks G and H will be determined to be equal to "2i+3" and "2i+4" respectively.

Thus, in addition to the effect of the first embodiment, this embodiment provides an additional effect that an address error can be corrected to restore a right address by utilizing the consecutiveness of addresses only if at least two addresses are restored by the plural addresses provisionally determining section 14A.

Note that the right address cannot be determined if "k" is wrongly read out for "2i" or "k'" is wrongly read out for "2i+2". Such a case can be avoided by increasing the number of addresses restored by the plural addresses provisionally determining section 14A from two to three.

6th Embodiment

Now, a sixth embodiment of the invention will be described by referring to FIGS. 29 through 31.

Referring firstly to FIG. 29, like the first embodiment, this embodiment of information reproduction system comprises an code reading section 10, a block detecting section 12, an address data acquiring section 14, a restoration control section 16, a block data restoring section 18 and an information data reproducing section 20 and the address data acquiring section 14 has a plural addresses provisionally determining section 14A, a format information storage section 14B and an address determining section 14C. Additionally, in this embodiment, the restoration control section 16 has a convincedness determining section 16A and a re-restoration control section 16B.

Since the components and their functions other than the restoration control section 16 of this embodiment are identical with their counterparts of the first embodiment, they will not be described here any further and only the restoration control section 16 will be described hereinafter.

The convincedness determining section 16A of the restoration control section 16 gives a rating of "1" to the convincedness when the output of the plural addresses provisionally determining section 14A and that of the address determining section 14C are equal to each other for an attentional block and a rating of "0" when the two outputs are different from each other. The re-restoration control section 16B stores the convincedness data given by the convincedness determining section 16A with the address of the attentional block as a re-restoration prohibition flag so that the data of the attentional block will not be re-restored when the re-restoration prohibition flag is "1" but will be re-restored when the flag is "0".

The operation of the restoration control section 16 will be described by referring to FIGS. 30A and 30B showing that the lens of the image pick-up means has a stain 42 and the data located in the vicinity of the stain can give rise to an error. Assume that the code is scanned continuously manually so that the blocks A, B, C and D are read out in the m-th frame and the blocks C, D, E and F are read out in the m+1-th frame in a manner as shown in FIG. 31.

Referring firstly to FIG. 30A, since there is no currently exhibited re-restoration prohibition flag in the m-th frame, the data of all the blocks there will be restored. Since the addresses provisionally determined by the plural addresses provisionally determining section 14A are equal to the addresses determined by the address determining section 14C for the blocks A through C, a rating of "1" will given to the addresses and a re-restoration prohibition flag will be exhibited (or the flag will be turned from "0" to "1" because "0" is the default value). However, on the other hand, since an address error occurs to the block D due to the stain 42 on the lens to make the provisionally determined address different from the determined address, a rating of "0" will be given to the block D and no re-restoration prohibition flag will be exhibited for that block.

Now, referring to FIG. 30B showing the m+1-th frame, since a re-restoration prohibition flag is already exhibited for the address "i+2" of the block C in the preceding frame, the data of the block will not be restored here. On the other hand, since no re-restoration flag is exhibited for the blocks D through F, the data will be restored from the blocks. Note that the data of the block D that is restored in the preceding frame is re-restored in this frame and the data of the block D picked up as part of the m-th frame and affected by the stain 42 of the lens is replaced by the data taken up as part of the m+1-th frame that is clearly picked up. Note also that a rating of "1" is given to the blocks D and E for convincedness and a re-restoration flag will be exhibited for them, whereas no re-restoration flag will be exhibited for the block F because there is an address error in that block.

Thus, in addition to the effect of the first embodiment, this embodiment provides an additional advantage of reducing faulty code reproductions by selectively restoring highly reliable block data.

7th Embodiment

Now, a seventh embodiment of the invention will be described by referring to FIG. 32. Note that, in this embodiment, blocks are arranged for a code in a format where they have consecutive addresses in the scanning direction and the information reproduction system of this embodiment differs from that of the sixth embodiment only in that the address determining section 14C includes an address storage section (not shown) for storing the determined addresses.

Thus, with this embodiment, the address determining section 14C determines the addresses of laterally arranged two blocks simultaneously and the larger ones of the two addresses is stored in the address storage section (not shown) for each address determining operation.

Referring to FIG. 32, for the m-th frame, the blocks A and B are read out and the address "i+1" is stored in the address storage section. Then the blocks C and D are read out and the address "i+3" is stored in the address storage section. When the blocks C and D are read out, the convincedness determining section 16A determines the difference of the address "i+1" stored in the address storage section (not shown) from the addresses "i+2" and "j" of the two blocks provisionally determined by the plural addresses provisionally determining section 14A for convincedness. A rating of "1" will be given to any block(s) (block C) showing a difference equal to "2" or less, whereas a rating of "0" will be given to any block(s) (block D) showing a difference greater than "2" and exhibits a re-restoration prohibition flat for the block(s). When restoring the block data, the re-restoration control section 16B so controls the block data restoring section 18 that the latter re-restores any block data if a re-restoration flag of "0" is exhibited even when the block data has already been restored but would not restore any data if a re-restoration prohibition flag of "0" is exhibited.

Thus, in addition to the effect of the first embodiment, this embodiment provides an additional advantage of determining the convincedness of the correctness when addresses are provisionally determined by the plural addresses provisionally determining section 14A according to the difference between the addresses determined immediately before and the restored addresses to improve the processing speed of the information reproduction system.

8th Embodiment

Now, an eighth embodiment of the invention will be described by referring to FIG. 33.

With the eighth embodiment, the address data of each block carries an error correction code affixed to it.

Figure 33:
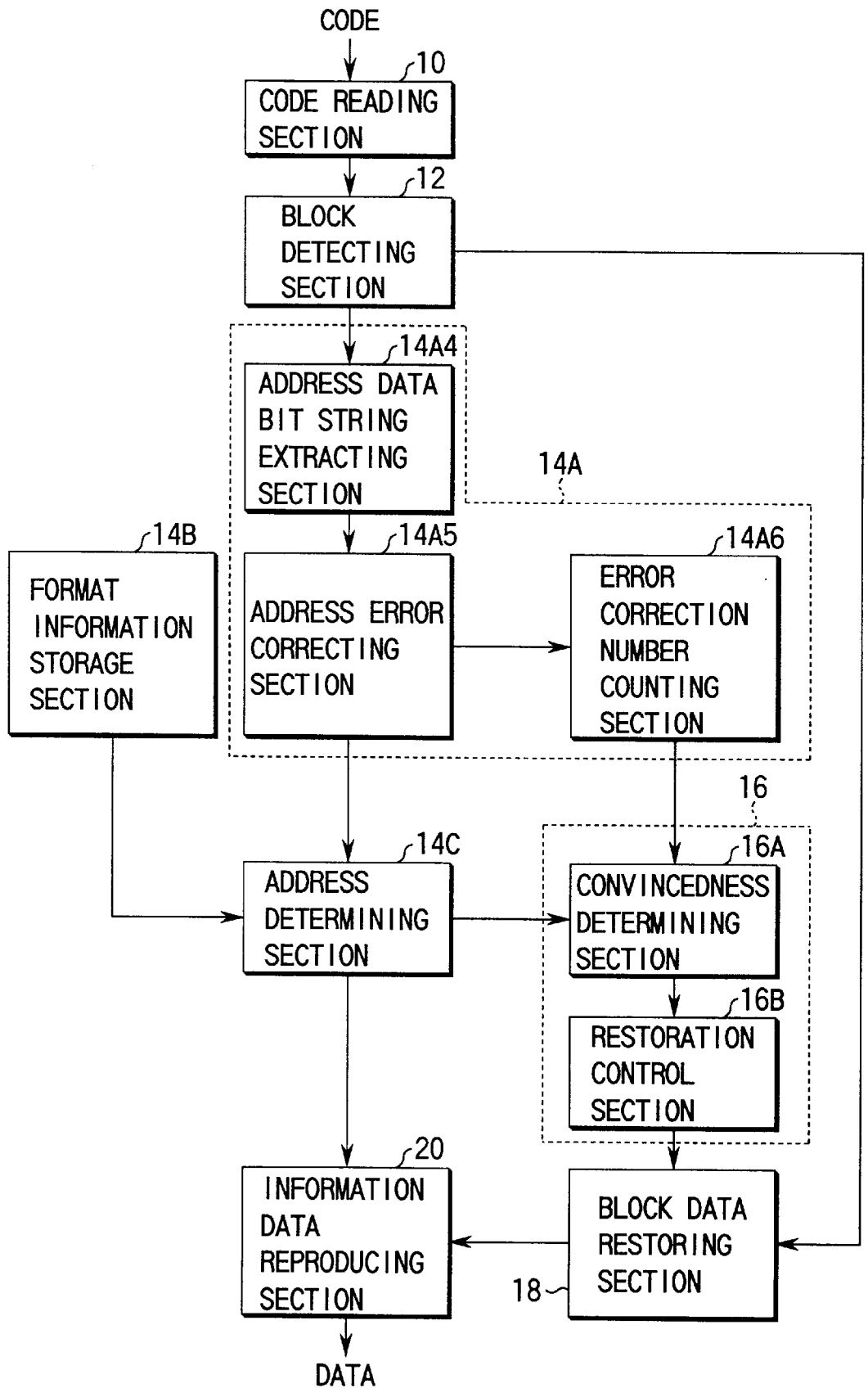
FIG. 33 is a schematic block diagram of an eighth embodiment of information reproduction system according to the invention.

As shown in FIG. 33, the plural addresses provisionally determining section 14A of this embodiment includes an address data bit string extracting section 14A4, an address error correcting section 14A5 and an error correction number counting section 14A6, which error correction number counting section 14A6 outputs error correction bit numbers to the convincedness determining section 16A.

A known coding method such as BCH coding system or a CRC coding system may be used for error correction codes to be used in this embodiment.

The address data bit string extracting section 14A4 reads out address data from the block detected by the block detecting section 12 and the address error correcting section 14A5 performs an error correcting operation on the read out address data. Then, the error correction number counting section 14A6 counts the number of the bits corrected by the address error correcting section 14A5 and the convincedness determining section 16A determines the rating of convincedness of the attentional block by subtracting the count from the correctable number of bits of the address error correcting section 14A5. The re-restoration control section 16B stores the rating of convincedness with the related address so that the block data of the attentional block would not be re-restored if the rating of convincedness of the attentional block is lower than the stored rating at the time of restoring block data but would be restored if the reverse is true.

This operation will be described by referring to FIG. 34. Assume here that data are read out from blocks A, B, C and D in the m-th frame and from blocks C, D, E and F in the m+1-th frame.

As for the m-th frame, a rating of "0" is currently given to all the blocks of A through D for convincedness so that the data of all the block will be restored. If the correctable number of bits of the address error correcting section 14A5 is "8", a rating of "7" will given to the block A for convincedness because the number of address error correction bits is "1". Similarly, ratings of "3", "6" and "4" will be given to the blocks B, C and D for convincedness respectively.

Then, in the m+1-th frame, while a rating of "4" is given to the block C for convincedness, a rating of "6" is given to it in the preceding frame and hence the rating of this frame is lower than that of the preceding frame so that no re-restoration will be performed in this frame. On the other hand, a rating of "6" is given to the block D for convincedness while "4" is given to it in the preceding frame and hence the rating of this frame is higher than that of the preceding frame so that an operation of re-restoration is performed here and a rating of "6" is given to the block for convincedness. Finally, a rating of "0" is given to both of the blocks E and F so that the data of these block will be restored and ratings of "0" and "5" will be given to them respectively for convincedness.

Thus, in addition to the effect of the first embodiment, this embodiment provides an additional advantage of reducing faulty code reproductions by using numerical ratings for convincedness to restore only highly reliable block data.

9th Embodiment

Now, a ninth embodiment of the invention will be described by referring to FIG. 35.

With this embodiment, the address data of each block carries an error correction code affixed to it.

The plural addresses provisionally determining section 14A of this embodiment includes an address data bit string extracting section 14A4 and an address error correcting section 14A5. Additionally, in this embodiment, the restoration control section 16 has a bit string comparing section 16C in place of the convincedness determining section 16A and an address data bit generating section 44 is arranged between the address determining section 14C and the bit string comparing section 16C.

In the plural addresses provisionally determining section 14A, the address data bit string extracting section 14A4 extracts an address data bit string and the address error correcting section 14A5 performs an error correcting operation on the extracted address data bit string. Meanwhile, the address data bit string generating section 44 transforms the address determined by the address determining section 14C into the original address data bit string that has been coded and recorded and supplies it to the bit string comparing section 16C. The bit string comparing section 16C compares the supplied address data bit string with the address data of the attentional block extracted by the address data bit string extracting section 14A4 on a bit by bit basis to count the number of bits that have given rise to errors and extract it from the total number of bits of the address data to determine a rating for convincedness. The re-restoration control section 16B controls the operation of re-restoring block data on the basis of the rating of convincedness in a manner as described above by referring to the eighth embodiment.

Thus, in addition to the effect of the first embodiment, this embodiment provides an additional advantage that the number of error bits can be accurately determined even if the address error correcting section 14A5 wrongly corrects address errors and hence block data can be restore more reliably to reduce faulty code reproductions.

10th Embodiment

Now, a tenth embodiment of the invention will be described by referring to FIGS. 36 and 37.

Figure 36:
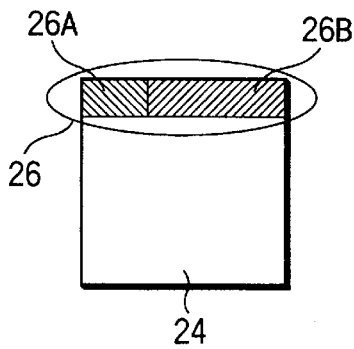
FIG. 36 schematically shows the structure of a block that can be use for a tenth embodiment of information reproduction system according to the invention.

With this embodiment, the header 26 of each block has an auxiliary data 26B affixed to the address data 26A as reproduction control information as shown in FIG. 36. For the purpose of the embodiment, the reproduction control information refers to information common to all the blocks of a code so that the block data 24 can be restored from any block. In other words, the auxiliary data 26B is invariable throughout all the blocks of the code.

Figure 37:
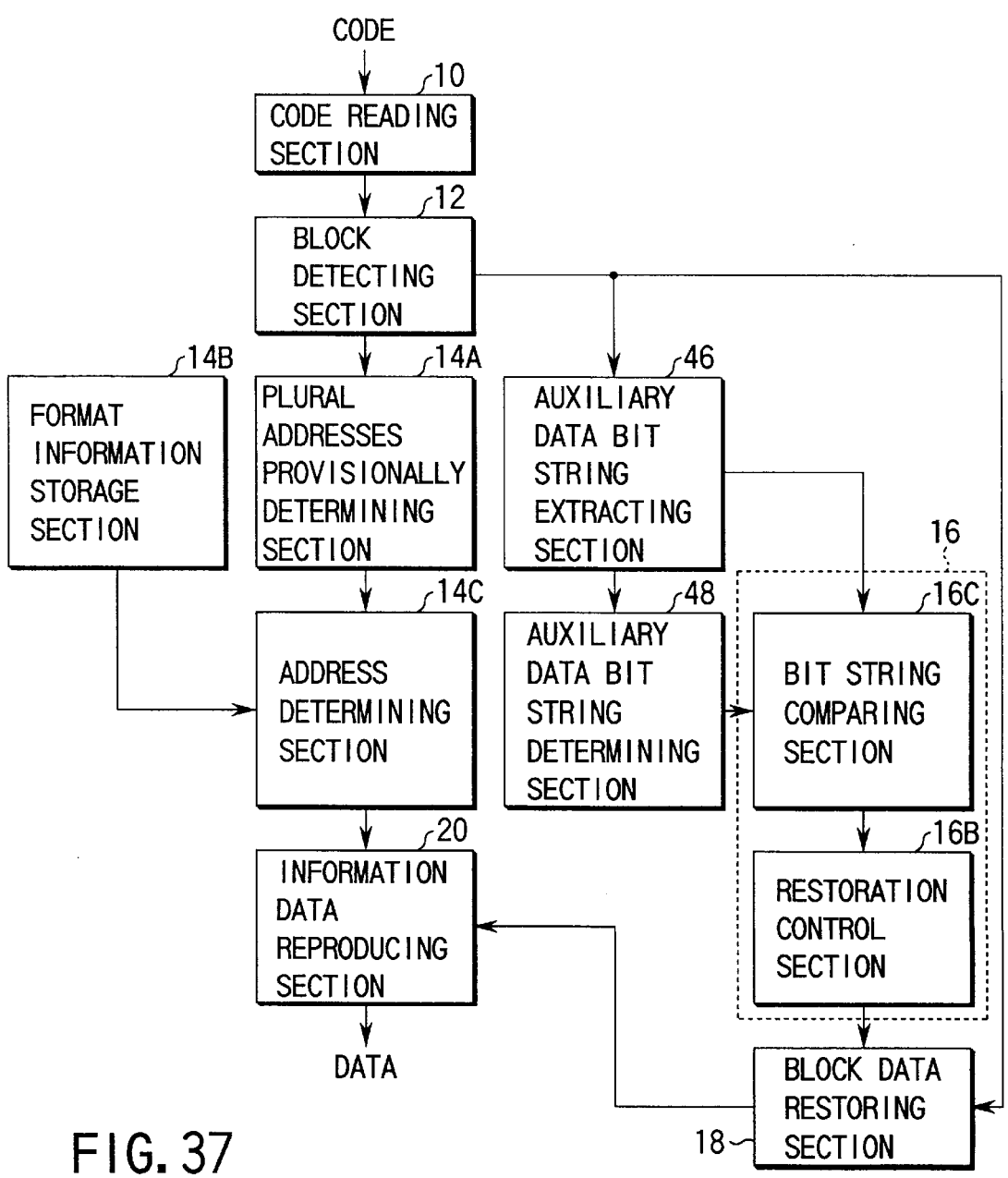
FIG. 37 is a schematic block diagram of the tenth embodiment.

Referring to FIG. 37, the information reproduction system of this embodiment differs from the ninth embodiment in that the address data bit string generating section 44 of the ninth embodiment is replaced by an auxiliary data bit string extracting section 46 and an auxiliary data bit string determining section 48.

The auxiliary data bit string extracting section 46 extracts the bit string of the auxiliary data 26B from each of the blocks detected by the block detecting section 12 and the auxiliary data bit string determining section 48 determines and stores the auxiliary data bit string from a plurality of auxiliary data bit strings detected by the section 46 on a decision by majority basis. Then, the bit string comparing section 16C of the restoration control section 16 compares the auxiliary data bit string stored in the auxiliary data bit string determining section and its counterpart in the attentional block extracted by the auxiliary bit string extracting section 46 on a bit by bit basis to detect any disagreeing bits and determine a rating for convincedness according to the number of the detected disagreeing bits.

Thus, in addition to the effect of the first embodiment, this embodiment provides an additional advantage that the level of convincedness can be determined independently from the address by comparing the auxiliary data of different blocks that are supposed to be same for all the blocks of a code.

11th Embodiment

All or some of the features of the first through tenth embodiments described above can be combined.

An eleventh embodiment of the invention can be realized by combining such features and the operation of the embodiment of reading a code having a block arrangement format as shown in FIG. 25 will be described by referring to FIGS. 38 through 41.

Figure 38:
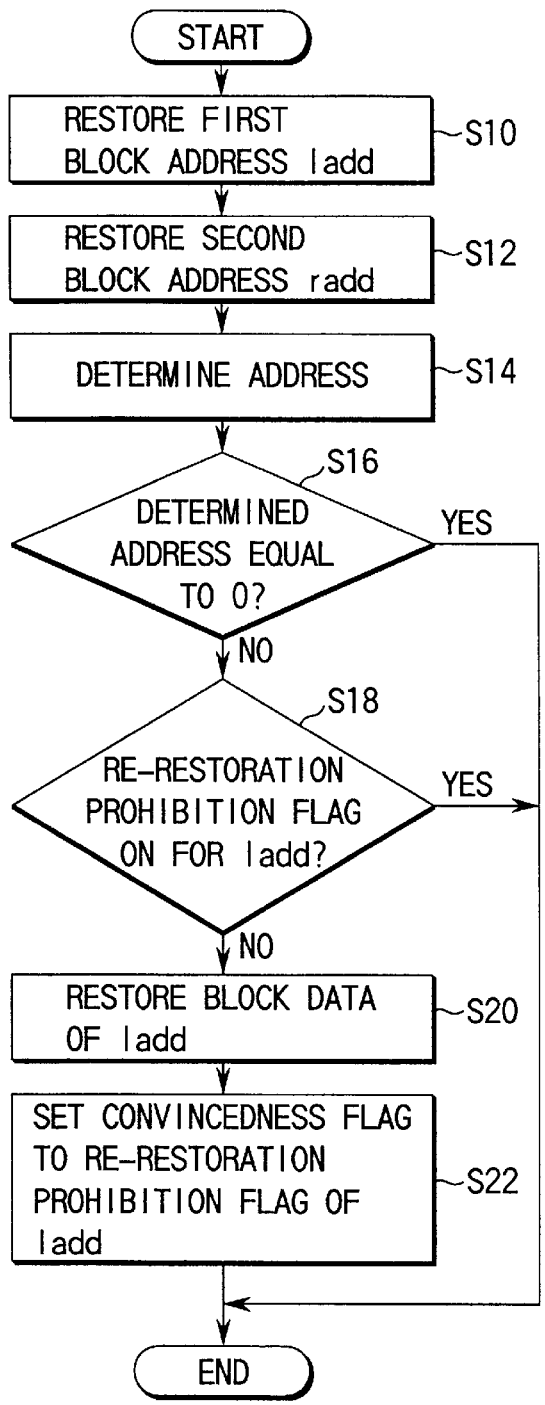
FIG. 38 is a flow chart for the processing operation of address data acquisition and block data re-restoration that can be used for an eleventh embodiment of information reproduction system according to the invention.

Firstly, the operational steps from address data acquisition to block data restoration will be described by referring to the flow chart of FIG. 38.

The plural addresses provisionally determining section 14A restores the addresses of the first and second blocks detected by the block detecting section 12 and provisionally determines them to be as ladd and radd respectively (Steps S10 and S12). Assume here that the first block is the attentional block. Then, the address determining section 14C determines the addresses by using the provisionally determined ladd and radd (Step S14) and, if the determined address ladd is equal to "0" (Step S16) or a re-restoration prohibition flag is already exhibited for the attentional block ladd (Step S18), the processing operation is terminated without restoring the block data.

Otherwise, the block data is restored (Step S20) and a rating is given for convincedness to the re-restoration prohibition flag of ladd (Step S22).

Note that the first embodiment can be applied to the above operational steps.

Figure 39:
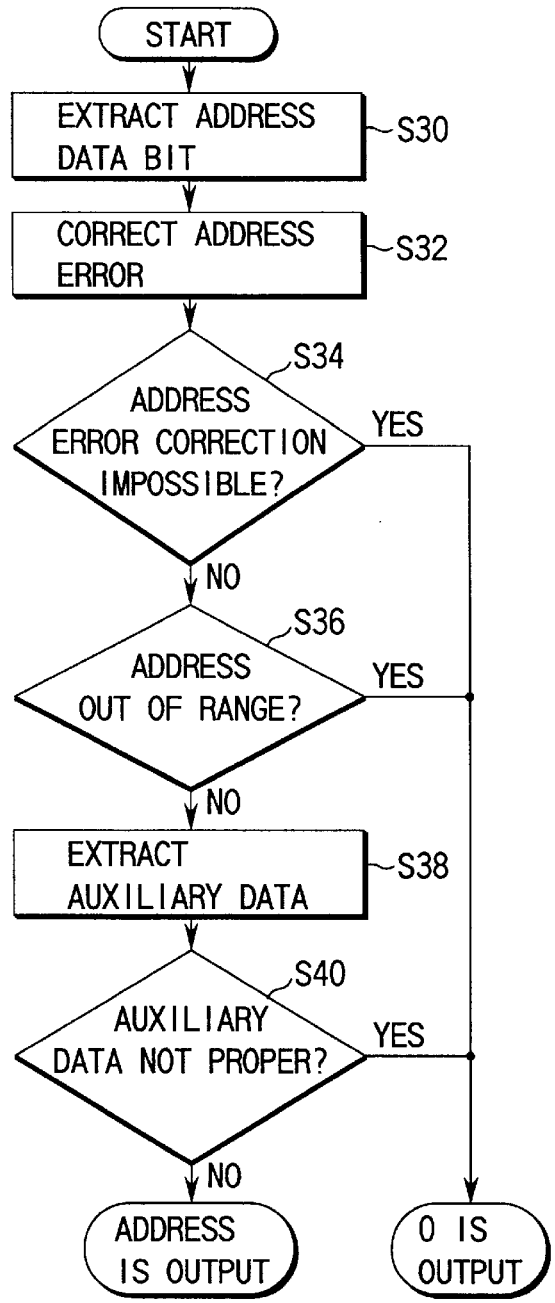
FIG. 39 is a flow chart for the processing operation of provisional address determination that can be used for the eleventh embodiment.

Now, the operation of the plural addresses provisionally determining section 14A will be described by referring to the flow chart of FIG. 39.

Firstly, it extracts the address data from the detected block (Step S30) and restores the address of the block by correcting any address error (Step S32). Note that the section 14A outputs an address of "0" when the address error is found to be out of a correctable range (Step S34) or the restored address is found to be out of a range defined for the information reproduction system (Step S36).

Note that the second embodiment can be applied to the above operational steps.

If the error is found to be correctable (Step S34) and the restored address is found to be within the range defined for the information reproduction system (Step S36), the auxiliary date 26B is extracted (Step S38) and its properness is checked by the bit string comparing section 16C (Step S40). If an error is detected in this step, the auxiliary data is determined to be improper and "0" is output. If, on the other hand, the auxiliary data is judged to be proper, the corrected address will be output.

Figure 40:
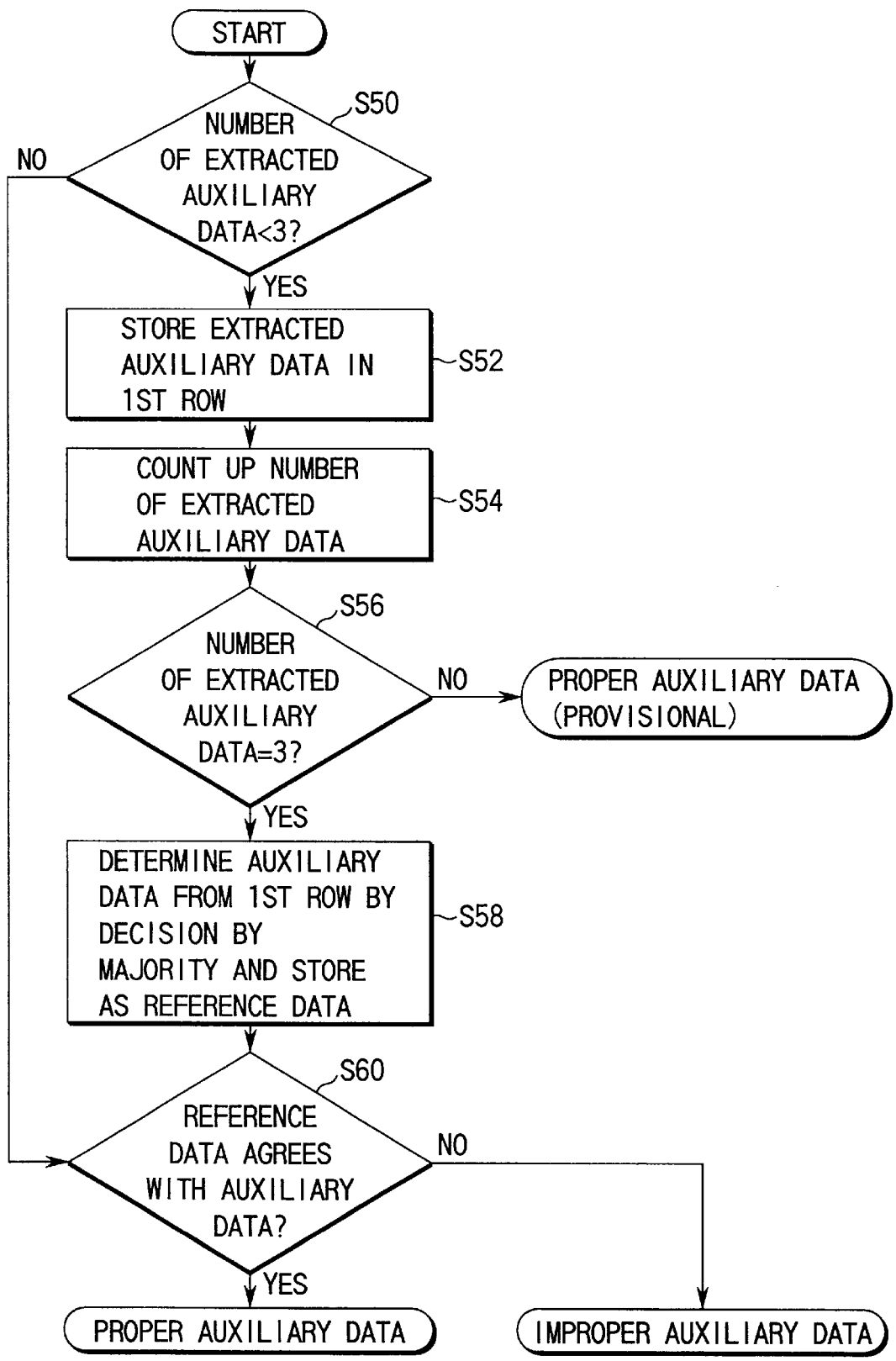
FIG. 40 is a flow chart for the operation of comparing auxiliary data comparison.

The operation of comparing auxiliary data 26B will be described by referring to the flow chart of FIG. 40.

Firstly, the number of extracted auxiliary data 26B is examined and, if it is found to be less than "3" (Step S50), the extracted auxiliary data are stored in an array for preparing a pattern for comparison (Step S52) and the number of extracted auxiliary data is counted up (Step S54). If the counted up number is found to be equal to "3" (Step S56), a reference data is prepared for comparison from the three auxiliary data stored in the array on a decision by majority basis and stored (Step S58). If the number of extracted auxiliary data is found to be still less than "3", the auxiliary data are provisionally determined to be proper and the outcome will be produced as output because any properness cannot be judged for them.

If, on the other hand, the number of extracted auxiliary data is equal to or greater than "3" in the Step S50, it means that a reference data has been stored and, therefore, a newly extracted auxiliary data 26B is compared with the reference data to check it for any errors (Step S60). The auxiliary data is determined to be improper if any error is found. Otherwise, it is determined to be proper.

It will be appreciated that the tenth embodiment can be applied to the above operational steps.

Figure 41:
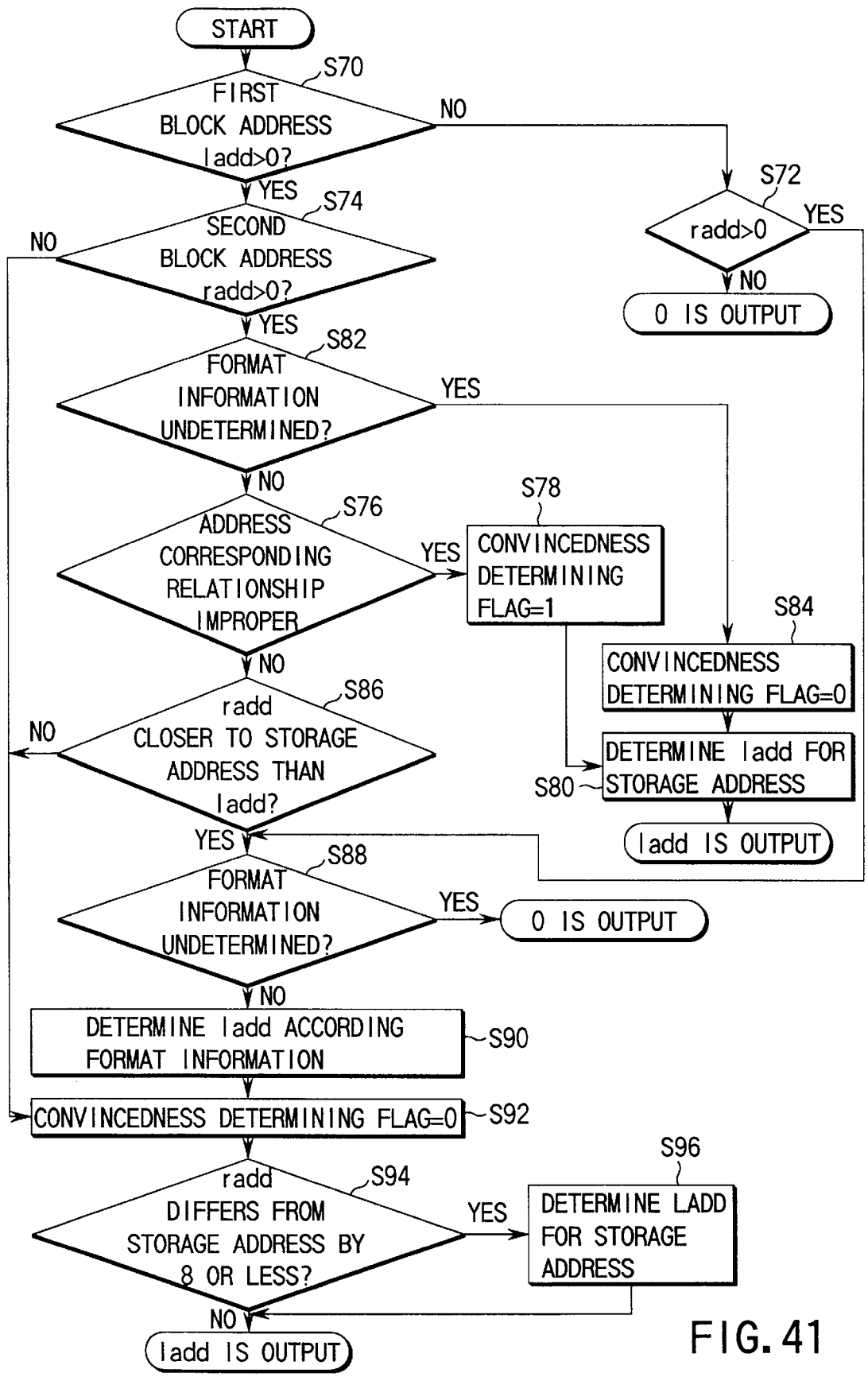
FIG. 41 is a flow chart for the processing operation of determining an address.

Now, the operation of the address determining section 14C will be described by referring to the flow chart of FIG. 41.

Firstly, if the first block address and/or the second block address (ladd, radd) is equal to "0" or not is checked (Steps S70, S72, S74) and, if it is found that only one of them is correctly restored, the address will be determined on the basis of the properly restored one.

If the both addresses are restored, the corresponding relationship of the restored two addresses and its matching with the format information are checked (Step S76) and a rating of "1" is given for convincedness if matching is confirmed (Step S78). Then, ladd is stored in the address storage section (Step S80) and it is output as the determined address.

If no format information is stored at this point (Step S82), the corresponding relationship between ladd and radd is checked and the outcome of the check is stored in the format information storage section 14B and a rating of "0" is given for convincedness (Step 84). Then, ladd is stored in the address storage section (Step S80) and it is output as the determined address.

If the corresponding relationship is found to be not matching the stored format information (Step 76), either ladd or radd that is closer to the address stored in the address storage section is selected (Step S86) and used for determining the address.

It will be appreciated that the fourth and fifth embodiments can be applied to the above operational steps.

Format information is needed if radd is used for determining the address. Then, it is not possible to determine an address if no format information is stored (Step S88) and hence "0" will be output as the determined address.

If format information is stored, ladd will be selected according to the format information (Step S90) and a rating of "0" is given for convincedness (Step S92). If ladd is closer to the address stored in the address storage section (Step S86), a rating of "0" is also given for convincedness (Step S92). Thus, unless the addresses are found to be matching the stored format information (Step S76), a rating of "0" is given for convincedness and ladd will be output as the determined address.

It will be appreciated that the modified sixth embodiment is applicable to the above operational steps because the convincedness is determined on the basis of matching of the determined address and the provisionally determined address.

With such an arrangement, if a determined address is wrong, the data of the block having the address can be re-restored.

Only when the difference between ladd and the address stored in the address storage section is less than "8" (Step S94), ladd will be stored as address (Step S96). If the determined address is wrong, the adverse affect of the wrong address can be prevented from affecting the subsequent process of determining addresses by these steps.

As will be appreciated, various features of the present invention that are incorporated into the above embodiments can be combined to further reduce the rate of faulty code reproduction due to address errors.

While the present invention is described above by way of preferred embodiments, the present invention is not limited to the embodiments, which may be modified and/or changed in various different ways without departing from the scope of the invention. For instance, while the above embodiments are described in terms of audio information, they are equally applicable to video information, digital code data and other multimedia information.

Now, the present invention will be summarily described below.

(1) An information reproduction system comprising:

image reading means for picking up and optically reading a code having a plurality of blocks arranged according to a predetermined block arrangement format, each of the blocks having at least a data pattern image corresponding to the contents of a block data formed by dividing the information data of the code by a given data volume and a header pattern image formed according to a block header indicating an address allocated to the block, so as to make each picked up image contain more than one blocks;

block detection means for detecting each block from each code image picked up by the image reading means;

address data acquisition means for acquiring the address data of each block detected by the block detection means;

block data restoration means for restoring the block data of each block detected by the block detection means from the data pattern of the block; and information data reproduction means for combining the block data of the blocks of the codes restored by the block data restoration means according to the address data acquired by the address data acquisition means, wherein the address data acquisition means includes:

plural address provisionally determining means for restoring and provisionally determining the address data of each of two or more than two blocks detected out of a picked up image by the block detection means;

format information storage means for storing the format information relating to the address allocation for each of the blocks of the code to be read; and address determining means for determining the address of each of the blocks according to the address data of the two or more than two blocks provisionally determined by the plural address provisionally determining means and the format information stored in the format information storage means.

The above arrangement corresponds to the first embodiment as shown in FIG. 1.

More specifically, the address data acquisition means is the address data acquiring section 14 of the first embodiment that includes an plural addresses provisionally determining section 14A, a format information storage section 14B and an address determining section 14C, which corresponds to the plural address provisionally determining means, the format information storage means and the address determining means respectively. The format information relating to the address allocation for each of the blocks of the code to be read is stored in the format information storage section 14B and the plural addresses provisionally determining section 14A restores from two or more than two blocks detected out of a picked up image by the block detecting section 12, or the block detection means, and provisionally determines the address data for them. Then, the address determining section 14C determines the address of each of the blocks according to the provisionally determined two or more than two address data and the format information stored in the format information storage section 14B.

Referring to FIG. 1, the restoration control section 16 controls the operation of restoring the data of the attentional block according to the addresses acquired by the address data acquiring section 14. For example, it stores the address of each restored block and, if the address of the restored block is entered by the address data acquiring section 14, it controls the block data restoring section 18, or the block data restoration means, such that the data of the block would not be restored for another time. However, note that the restoration control section 16 is not indispensable for the purpose of the invention.

Note that each block includes a block header 26 and a block data 24 as shown in FIG. 2 and has a structure as shown in FIG. 3 for storing them. The block may have a profile other than rectangular and may be trigonal or hexagonal of shape. In short, the profile and the arrangement of the components may not be limited to those illustrated in FIGS. 2 and 3. While blocks may be arranged into a format as shown in FIG. 4, any of the formats shown in FIGS. 11, 15 and 25 may alternatively be used for the purpose of the invention.

With the address data acquisition means having the above described configuration, the address of an attentional block can be determined from the address data of a plurality of blocks, each having a predetermined positional relationship with the attentional block, according to the format information. Thus, address errors can be prevented and faulty code reproductions can be reduced by determining the address of an attentional block on the basis of the addresses of at least two or more than two blocks and their corresponding relationships with the address of the attentional block.

Additionally, the address data of the blocks in a picked up image are used to make the manual scanning operation of the image pick-up means feasible.

(2) The information reproduction system as defined in (1), wherein the plural addresses provisionally determining means includes:

address properness judging means for judging if each of the provisionally determined address data is a proper address data of a code applicable to the information reproduction system; and address output control means for prohibiting any address data determined to be improper by the address properness judging means from being output to the address determining means.

Figure 9:
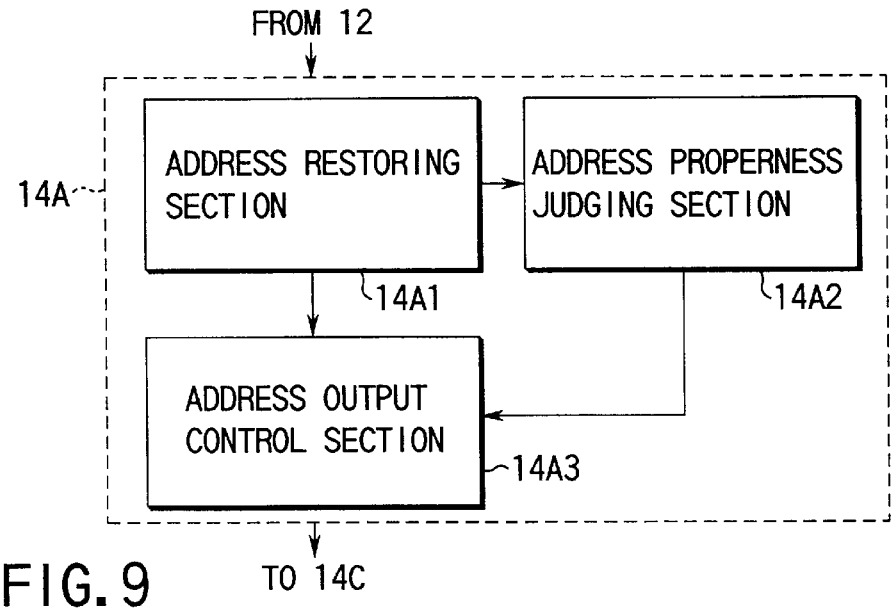
FIG. 9 is a schematic illustration of the plural addresses provisionally determining section of a second embodiment of information reproduction system according to the invention.

The above arrangement corresponds to the second embodiment as shown in FIG. 9.

The address properness judging section 14A2, or the address properness judging means, judges if the read out address is a proper one for the information reproduction system. If the address is judged to be improper, the address output control section 14A3, or the address output control means, prohibits the address from being output to the address determining section 14C. For example, an address is judged to be improper for the information reproduction system when the restored address is found to be out of a range defined for the information reproduction system or an address error is found to be out of a correctable range.

Thus, improper addresses are prevented from being used for determining an address to improve the efficiency of the address determining operation and the reliability of the finally determined address.

(3) The information reproduction system as defined in (1), wherein the format information storage means contains a table data for a table illustrating the corresponding relationship of the physical location of each of the blocks of the code to be read out and the address allocated to the block.

The above arrangement corresponds to the third embodiment as shown in FIG. 10.

The format information storage means and the address determining means correspond respectively to the corresponding relationship table data storage section 14D and the address matching section 14E.

The corresponding relationship table may contain the locations and the addresses of all the blocks of the code as shown in FIG. 12 or, alternatively, only the relative locations of the blocks and their corresponding relationships with the addresses as shown in FIG. 6.

The corresponding relationship table data storage section 14D stores a corresponding relationship table for the block arrangement format of the code and the corresponding addresses and the address matching section 14E examines whether the addresses provisionally determined by the plural addresses provisionally determining section 14A matches with the corresponding relationship table, and determines an address based on the examined result.

Thus, the above arrangement of the format information storage means can deal with a code having blocks that are not aligned in accordance with the order of the addresses.

(4) The information reproduction system as defined in (1), wherein the format information storage means includes means for detecting and identifying the block arrangement format of the read out code from a plurality of address data provisionally determined by the plural addresses provisionally determining means.

The above arrangement corresponds to the fourth embodiment having a configuration as shown in FIG. 1.

The format information storage section 14B identifies the block arrangement format from the addresses and their locational relationship provisionally determined by the plural addresses provisionally determining section 14A and stores the addresses having the corresponding relationship. Then, the address determining section 14C determines the addresses, utilizing the corresponding relationship of the provisionally determined addresses and the stored addresses.

Thus, with the format information storage means having the above described configuration, the block arrangement format can be identified from the read out code to eliminate the need of preparing an invariable address corresponding relationship table in advance so that blocks can be arranged without significant restrictions.

(5) The information reproduction system as defined in (1), wherein the format information stored in the format information storage means indicates that addresses are allocated to the blocks of the code incrementally or decrementally, and the address determining means includes;

address storage means for storing a determined address; and means for determining the addresses of the remaining blocks by referring to the address data having a value closest to the address stored in the address storage means out of the plurality of address data provisionally determined by the plural addresses provisionally determining means.

The above arrangement corresponds to the fifth embodiment having a configuration as shown in FIG. 1. The address determining section 14C, or the address determining means, includes an address storage section, or address storage means, for storing a determined address.

The address determining section 14C stores the determined address in the address storage section each time it determines an address and the plural addresses provisionally determining section 14A determines the address closest to the address stored in the address storage section to be as the most probable address out of the plural addresses provisionally determined by the plural addresses provisionally determining section 14A so that the address of the attentional block can be determined on the basis of the corresponding relationship between the address and that of the attentional block. Note that the address storage section stores the address determined by the address determining operation conducted immediately before the current address determining operation.

Thus, with the address determining means having the above described configuration, addresses can be determined by utilizing the numerical consecutiveness of the addresses of the blocks being read out. Then, the plural addresses provisionally determining means can restore an address by reading at least two addresses including it if the address cannot be restored by itself.

(6) The information reproduction system as defined in (1), further comprising:

convincedness determining means for determining the convincedness for a block data by comparing the address data of the address for the block data provisionally determined by the plural addresses provisionally determining means and the address data of the address determined by the address determining means; and re-restoration control means for prohibiting or permitting the restoration by the block data restoration means of the block data having a same address in the subsequently picked up images according to the outcome of the determining operation of the convincedness determining means.

The above arrangement corresponds to the sixth embodiment as shown in FIG. 29.

The convincedness determining section 16A, or the convincedness determining means, determines the level of convincedness of the data of the attentional block according to the outcome of the plural addresses provisionally determining section 14A and that of the address determining section 14C. The level of convincedness will be high when the address determined by the address determining section 14C agrees with the address of the attentional block provisionally determined by the plural addresses provisionally determining section 14A but it will be low when the two addresses do not agree with each other. Then, the re-restoration control section 16B, or the re-restoration control means, so controls the block data restoring section 18 that the latter restores a block data if the block data has been restored when it shows a low convincedness level but does not restore a block data when it shows a high convincedness level.

For the purpose of the invention, convincedness may alternatively be determined on the basis of the number of error corrections of the number of error detections obtained by using a reference pattern.

With the above described arrangement of controlling the block data restoring operation according to the level of convincedness, a block data with a low convincedness level can be re-restored when a block of the same address is detected in subsequently picked up images to reduce faulty code reproductions by selectively restoring highly reliable block data.

(7) The information reproduction system as defined in (1), wherein the format information stored in the format information storage means indicates that addresses are allocated to the blocks of the code incrementally or decrementally, the address determining means includes address storage means for storing a determined address, and the system further comprises:

convincedness determining means for comparing the address data of the address for a block data provisionally determined by the plural addresses provisionally determining means and the address data of the address, which is stored in the address storage means and proximately determined by the address determining means, and determining the convincedness for the block data on the basis of the consecutiveness of the addresses of the adjacent blocks; and re-restoration control means for prohibiting or permitting the restoration by the block data restoration means of the block data having a same address in the subsequently picked up images according to the outcome of the determining operation of the convincedness determining means.

The above arrangement corresponds to the seventh embodiment as shown in FIG. 29, where the address determining section 14C, or the address determining means, includes an address storage section that corresponds to the address storage means.

The address determining section 14C stores the determined address in the address storage section each time it determines an address and the convincedness determining section 16A, or the convincedness determining means, determines the level of the convincedness of the block data according to the outcome of the plural addresses provisionally determining section 14A and the address stored in the address storage section. The convincedness will be high if the difference between the address stored in the address storage section and the address of the attentional block provisionally determined by the plural addresses provisionally determining section 14A is equal to or less than "2" but it will be low if the difference is greater than "2". Then, the re-restoration control section 16, or the re-restoration control means, so controls the block data restoring section 18 that the latter restores a block data if the block data has been restored when it shows a low convincedness level but does not restore a block data when it shows a high convincedness level.

Note that the address storage section stores the address determined by the address determining operation conducted immediately before the current address determining operation.

Thus, with the address determining means having the above described configuration, addresses can be determined by utilizing the numerical consecutiveness of the addresses of the blocks being read out. Then, the plural addresses provisionally determining means can determine the convincedness of an address when the latter is provisionally determined to improve the efficiency of operation.

(8) The information reproduction system as defined in (1), wherein each block header carries an error correction code affixed to it, the plural addresses provisionally determining means includes:

address data bit string extracting means for extracting an address data bit string from each block detected by the block detection means;

address error correction means for performing an error correcting operation on each address data bit string extracted by the address data bit string extraction means; and error correction number counting means for counting the number of error corrections performed by the address error correction means for each address, and the information reproduction system further comprising:

convincedness determining means for determining the convincedness of the block data of each block according to the number of error corrections counted by the error correction number counting means; and re-restoration control means for prohibiting or permitting the restoration by the block data restoration means of the block data having a same address in the subsequently picked up images according to the outcome of the determining operation of the convincedness determining means.

The above arrangement corresponds to the eighth embodiment as shown in FIG. 33.

Thus, the address data carries an error correction code affixed to the address information for the purpose of this arrangement. The plural addresses provisionally determining section 14A causes the address error correcting section 14A5, or the address error correcting means, to perform an error correcting operation on the address data bit string extracted by the address data bit string extracting section 14A4, or the address data bit string extracting means, and outputs the corrected address to the address determining section 14C. Then, the error correction number counting section 14A6, or the error correction number counting means, counts the number of the bits corrected by the address error correcting section 14A5 and transmits the outcome to the convincedness determining section 16A, or the convincedness determining means, which convincedness determining section 16A then determines the rating of convincedness of the attentional block according to the number of bits corrected for errors.

Thus, by having the plural addresses provisionally determining means configured in the above described manner, the number of address error corrections can be used to determine the convincedness in numerical values to delicately control the re-restoring operation.

(9) The information reproduction system as defined in (1), wherein each block header carries an error correction code affixed to it, the plural addresses provisionally determining means includes:

address data bit string extracting means for extracting an address data bit string from each block detected by the block detection means; and address error correction means for performing an error correcting operation on each address data bit string extracted by the address data bit string extraction means, and the information reproduction system further comprising:

address data bit string generating means for producing the original address data bit string by adding an error correction code to each address data determined by the address determining means;

convincedness determining means for determining the convincedness of the block data of each block by comparing the address data bit string generated by the address data bit string generating means and the corresponding address data bit string extracted by the address data extracting means; and re-restoration control means for prohibiting or permitting the restoration by the block data restoration means of the block data having a same address in the subsequently picked up images according to the outcome of the determining operation of the convincedness determining means.

Figure 35:
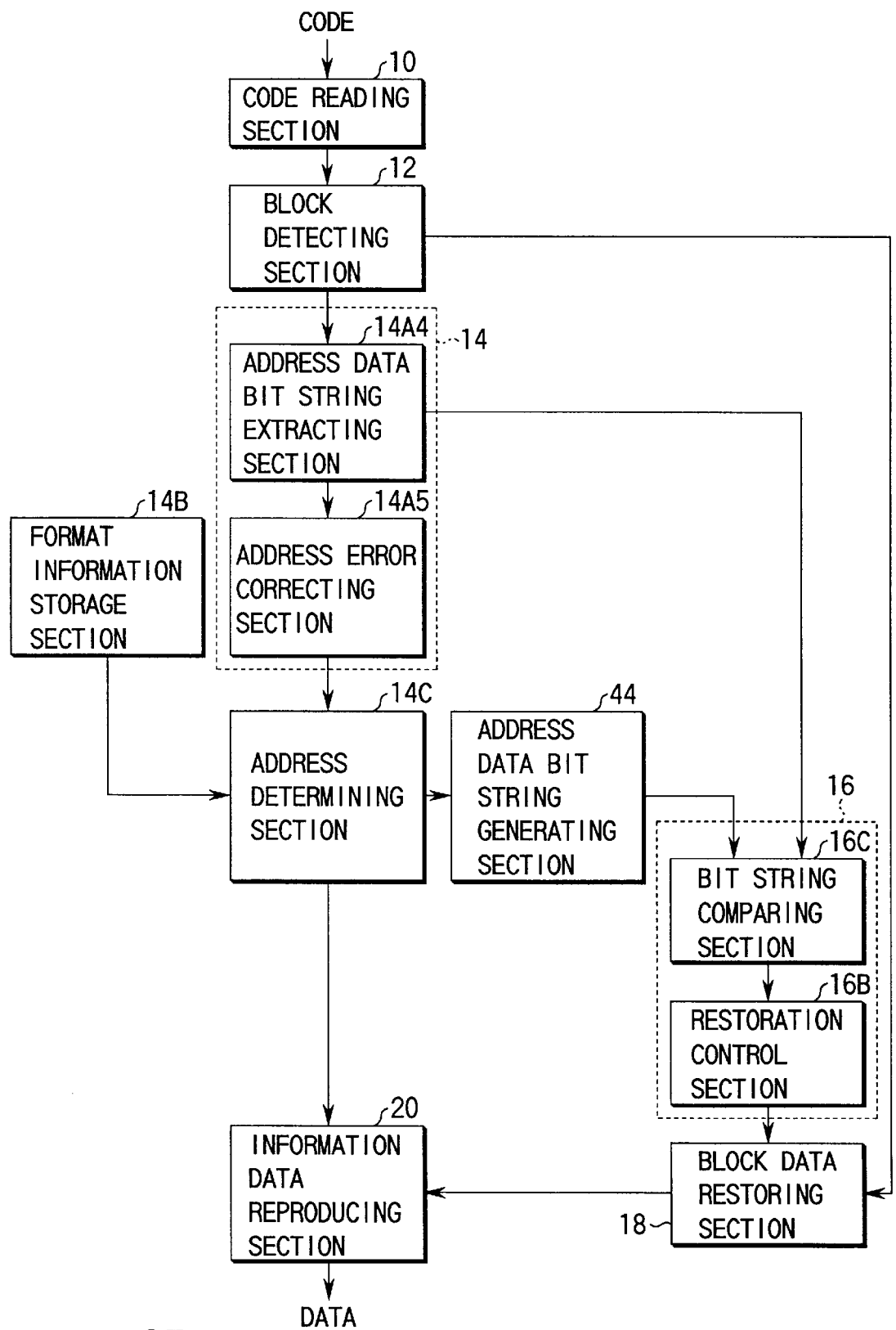
FIG. 35 is a schematic block diagram of a ninth embodiment of information reproduction system according to the invention.

The above arrangement corresponds to the ninth embodiment as shown in FIG. 35, where the bit string comparing section 16C corresponds to the convincedness determining means.

With this arrangement, the block header of each block carries an error correction code affixed to the address information of the block. The address data bit string generating section 44, or the address data bit string generating means, produces the original address data bit string by adding an error correction code to the address data determined by the address determining section 14C and the bit string comparing section 16C compares the coded address data bit string and the address data bit string of the attentional block extracted by the address data bit string extracting section 14A4, or the address data bit string extracting means, on a bit by bit basis to detect any disagreements. Then, the level of convincedness is determined as a function of the number of the detected disagreements.

Thus, outcome of the extraction by the address data bit string extracting means and the address data bit string obtained from the determined address are compared on a bit by bit basis so that the number of error bits can be accurately determined even if the address error correcting means wrongly corrects address errors and hence block data can be restore more reliably to reduce faulty code reproductions.

(10) The information reproduction system as defined in (1), wherein each block header contains an auxiliary data bit string indicating the auxiliary data that is common to all the blocks of the code, and the information reproduction system further comprising:

auxiliary data bit string extracting means for extracting the auxiliary data bit string from each of the blocks detected by the block detection means;

auxiliary data bit string determining means for determining the correct auxiliary data bit string out of the plurality of auxiliary data bit strings extracted by the auxiliary data bit string extracting means;

convincedness determining means for determining the convincedness of the block data of each block by comparing the auxiliary data bit string determined by the auxiliary data bit string determining means and the corresponding auxiliary data bit string extracted by the auxiliary data bit extracting means; and re-restoration control means for prohibiting or permitting the restoration by the block data restoration means of the block data having a same address in the subsequently picked up images according to the outcome of the determining operation of the convincedness determining means.

The above arrangement corresponds to the tenth embodiment as shown in FIG. 37, where the bit string comparing section 16C corresponds to the convincedness determining means.

With this arrangement, a block header is obtained by adding an auxiliary data to an address data and the auxiliary data is common to all the blocks of a code. The auxiliary data bit string extracting section 46, or the auxiliary data bit string extracting means, extracts the bit string of the auxiliary data from the block header of each of the blocks detected by the block detecting section. Then, the auxiliary data bit string determining section 48, or the auxiliary data bit string determining section, determines and stores the auxiliary data bit string from a plurality of detected auxiliary data bit strings. The bit string comparing section 16C compares the auxiliary data bit string stored in the auxiliary data bit string determining section and its counterpart in the attentional block extracted by the auxiliary bit string extracting section 46 on a bit by bit basis to detect any disagreeing bits and determine a rating for convincedness according to the number of the detected disagreeing bits. The auxiliary data is an invariable pattern that is common to all the block of the code and may refer to the reproduction control data concerning the data recording mode, the modulation mode or the data arrangement of the code. The auxiliary data bit string determining section 48 may simply stores the auxiliary data in advance in a system for dealing with a single piece of reproduction control information.

Thus, with the above arrangement, the level of convincedness can be determined independently from the address by comparing the auxiliary data of different blocks that are supposed to be same for all the blocks of a code.

Additional advantages and modifications will readily occur to those skilled in the art. Therefore, the invention in its broader aspects is not limited to the specific details and the representative devices shown and described herein. Accordingly, various modifications may be made without departing from the spirit or scope of the general inventive concept as defined by the appended claims and their equivalents.

What is claimed is:

1. An information reproduction system comprising:

image reading means for picking up and optically reading a code having a plurality of blocks arranged according to a predetermined block arrangement format, each of said blocks having at least a data pattern image corresponding to the contents of a block data formed by dividing the information data of the code by a given data volume and a header pattern image formed according to a block header indicating an address allocated to the block, so as to make each picked up image contain more than one blocks;

block detection means for detecting each block from each code image picked up by said image reading means;

address data acquisition means for acquiring the address data of each block detected by said block detection means;

block data restoration means for restoring the block data of each block detected by said block detection means from the data pattern of the block; and information data reproduction means for combining the block data of the blocks of the codes restored by said block data restoration means according to the address data acquired by said address data acquisition means, wherein said address data acquisition means includes:

plural addresses provisionally determining means for restoring and provisionally determining the address data of each of two or more than two blocks detected out of a picked up image by said block detection means;

format information storage means for storing the format information relating to the address allocation for each of the blocks of the code to be read; and address determining means for determining the address of each of the blocks according to the address data of the two or more than two blocks provisionally determined by said plural address provisionally determining means and the format information stored in said format information storage means.

2. The information reproduction system according to claim 1, wherein said plural addresses provisionally determining means includes:

address properness judging means for judging if each of the provisionally determined address data is a proper address data of a code applicable to the information reproduction system; and address output control means for prohibiting any address data determined to be improper by said address properness judging means from being output to said address determining means.

3. The information reproduction system according to claim 1, wherein said format information storage means contains a table data for a table illustrating the corresponding relationship of the physical location of each of the blocks of the code to be read out and the address allocated to the block.

4. The information reproduction system according to claim 1, wherein said format information storage means includes means for detecting and identifying the block arrangement format of the read out code from a plurality of address data provisionally determined by said plural addresses provisionally determining means.

5. The information reproduction system according to claim 1, wherein the format information stored in said format information storage means indicates that addresses are allocated to the blocks of the code incrementally or decrementally, and said address determining means includes;

address storage means for storing a determined address; and means for determining the addresses of the remaining blocks by referring to the address data having a value closest to the address stored in said address storage means out of the plurality of address data provisionally determined by said plural addresses provisionally determining means.

6. The information reproduction system according to claim 1, further comprising:

convincedness determining means for determining the convincedness for a block data by comparing the address data of the address for the block data provisionally determined by said plural addresses provisionally determining means and the address data of the address determined by said address determining means; and re-restoration control means for prohibiting or permitting the restoration by said block data restoration means of the block data having a same address in the subsequently picked up images according to the outcome of the determining operation of said convincedness determining means.

7. The information reproduction system according to claim 1, wherein the format information stored in said format information storage means indicates that addresses are allocated to the blocks of the code incrementally or decrementally, said address determining means includes address storage means for storing a determined address, and said system further comprises:

convincedness determining means for comparing the address data of the address for a block data provisionally determined by said plural addresses provisionally determining means and the address data of the address, which is stored in said address storage means and proximately determined by said address determining means, and determining the convincedness for the block data on the basis of the consecutiveness of the addresses of the adjacent blocks; and re-restoration control means for prohibiting or permitting the restoration by said block data restoration means of the block data having a same address in the subsequently picked up images according to the outcome of the determining operation of said convincedness determining means.

8. The information reproduction system according to claim 1, wherein each block header carries an error correction code affixed to it, said plural addresses provisionally determining means includes:

address data bit string extracting means for extracting an address data bit string from each block detected by said block detection means;

address error correction means for performing an error correcting operation on each address data bit string extracted by said address data bit string extraction means; and error correction number counting means for counting the number of error corrections performed by said address error correction means for each address, and the information reproduction system further comprising:

convincedness determining means for determining the convincedness of the block data of each block according to the number of error corrections counted by said error correction number counting means; and re-restoration control means for prohibiting or permitting the restoration by said block data restoration means of the block data having a same address in the subsequently picked up images according to the outcome of the determining operation of said convincedness determining means.

9. The information reproduction system according to claim 1, wherein each block header carries an error correction code affixed to it, said plural addresses provisionally determining means includes:

address data bit string extracting means for extracting an address data bit string from each block detected by said block detection means; and address error correction means for performing an error correcting operation on each address data bit string extracted by said address data bit string extraction means, and the information reproduction system further comprising:

address data bit string generating means for producing the original address data bit string by adding an error correction code to each address data determined by said address determining means;

convincedness determining means for determining the convincedness of the block data of each block by comparing the address data bit string generated by said address data bit string generating means and the corresponding address data bit string extracted by said address data extracting means; and re-restoration control means for prohibiting or permitting the restoration by said block data restoration means of the block data having a same address in the subsequently picked up images according to the outcome of the determining operation of said convincedness determining means.

10. The information reproduction system according to claim 1, wherein each block header contains an auxiliary data bit string indicating the auxiliary data that is common to all the blocks of the code, and the information reproduction system further comprising:

auxiliary data bit string extracting means for extracting the auxiliary data bit string from each of the blocks detected by said block detection means;

auxiliary data bit string determining means for determining the correct auxiliary data bit string out of the plurality of auxiliary data bit strings extracted by said auxiliary data bit string extracting means;

convincedness determining means for determining the convincedness of the block data of each block by comparing the auxiliary data bit string determined by said auxiliary data bit string determining means and the corresponding auxiliary data bit string extracted by said auxiliary data bit extracting means; and re-restoration control means for prohibiting or permitting the restoration by said block data restoration means of the block data having a same address in the subsequently picked up images according to the outcome of the determining operation of said convincedness determining means.

* * * * *